US012472124B2

(12) United States Patent
Matsunaka

(10) Patent No.: US 12,472,124 B2
(45) Date of Patent: Nov. 18, 2025

(54) MEDICINE APPLICATOR, MEDICINE APPLICATION KIT, AND PRESSING TOOL FOR MEDICINE APPLICATOR

(71) Applicant: Hisaaki Matsunaka, Kashiwara (JP)

(72) Inventor: Hisaaki Matsunaka, Kashiwara (JP)

(73) Assignee: Hisaaki Matsunaka, Kashiwara (JP)

( * ) Notice: Subject to any disclaimer, the term of this patent is extended or adjusted under 35 U.S.C. 154(b) by 246 days.

(21) Appl. No.: 17/919,892

(22) PCT Filed: Apr. 30, 2021

(86) PCT No.: PCT/JP2021/017281

§ 371 (c)(1),
(2) Date: Oct. 19, 2022

(87) PCT Pub. No.: WO2021/235219

PCT Pub. Date: Nov. 25, 2021

(65) Prior Publication Data

US 2023/0149265 A1 May 18, 2023

(30) Foreign Application Priority Data

May 20, 2020 (JP) ................................ 2020-088142
Jan. 14, 2021 (JP) ................................ 2021-004391
(Continued)

(51) Int. Cl.
*A61J 7/00* (2006.01)

(52) U.S. Cl.
CPC ........... *A61J 7/0076* (2013.01); *A61J 7/0015* (2013.01)

(58) Field of Classification Search
CPC ................. A47L 13/256; A47L 13/257; A45D 2200/1009; A45D 2200/1018;
(Continued)

(56) References Cited

U.S. PATENT DOCUMENTS 136,310 A * 2/1873 Devlan ................. A47L 13/257 15/244.1
701,637 A * 6/1902 Snellebrand .......... A47L 13/257 15/244.1
(Continued)

FOREIGN PATENT DOCUMENTS

CN 105078377 A 11/2015
CN 109771808 A 5/2019
(Continued)

OTHER PUBLICATIONS

KR 200354944 Y1 Machine translation (Year: 2004).*
(Continued)

*Primary Examiner* — David P Angwin
*Assistant Examiner* — Bradley S Oliver
(74) *Attorney, Agent, or Firm* — WHDA, LLP

(57) ABSTRACT

There is provided a medicine applicator that can attachably and detachably hold a treatment article and that can provide as large an effective area as possible of the treatment article used for application. A medicine applicator 100 includes: an arm 10 extending in a longitudinal direction, of which one end portion side is a grip portion 11; and a pedestal portion 222 disposed on the arm 10 to be substantially parallel to the longitudinal direction of the arm 10. The medicine applicator 100 is provided with a pair of pressing tools 130 that attachably and detachably hold an application member 300 on the pedestal portion 222, and the pair of pressing tools 130 include a repulsive tool 292 that generates a pressing force to bring the application member 300 into contact with the pedestal portion 222.

17 Claims, 26 Drawing Sheets

(30) Foreign Application Priority Data

Jan. 28, 2021 (JP) ................................. 2021-012299
Feb. 8, 2021 (JP) ................................. 2021-018081

(58) Field of Classification Search
CPC .... A45D 2200/1027; A45D 2200/1036; A45D 2200/1081; A47K 7/028
See application file for complete search history.

(56) References Cited

U.S. PATENT DOCUMENTS

| | | | | | |
|---|---|---|---|---|---|
| 1,451,200 | A | * | 4/1923 | Boyle | A47L 13/31 15/231 |
| 1,526,161 | A | * | 2/1925 | Lyon | A47L 13/29 15/231 |
| 1,664,908 | A | * | 4/1928 | Terpenning | A47L 13/46 15/150 |
| 1,855,635 | A | * | 4/1932 | Kelley | B24D 15/023 15/231 |
| 1,941,550 | A | * | 1/1934 | Garvey | A47L 13/23 401/203 |
| 2,201,645 | A | * | 5/1940 | Epner | B24D 15/023 451/519 |
| 2,753,669 | A | * | 7/1956 | Larson | B24B 7/10 451/354 |
| 4,574,788 | A | | 3/1986 | Jordan | |

FOREIGN PATENT DOCUMENTS

| | | | | | |
|---|---|---|---|---|---|
| JP | 3028789 | U | | 9/1996 | |
| JP | H09-047514 | A | | 2/1997 | |
| JP | 2897115 | B2 | | 5/1999 | |
| JP | 2001-129098 | A | | 5/2001 | |
| JP | 2005-103196 | A | | 4/2005 | |
| JP | 3176802 | U | | 7/2012 | |
| JP | 3214427 | U | | 1/2018 | |
| KR | 200354944 | Y1 | * | 7/2004 | A47K 7/028 |

OTHER PUBLICATIONS

International Search Report dated Jul. 20, 2021, issued in counterpart International Application No. PCT/JP2021/017281 (2 pages).

* cited by examiner

178

MEDICINE APPLICATOR, MEDICINE APPLICATION KIT, AND PRESSING TOOL FOR MEDICINE APPLICATOR

TECHNICAL FIELD

The present invention relates to a medicine applicator, a medicine application kit, and a pressing tool for a medicine applicator for applying a medicine or a cosmetic such as an antiphlogistic agent or a sunblock, particularly, to a medicine applicator, a medicine application kit, and a pressing tool for a medicine applicator suitable for a person to be applied to apply a medicine or a cosmetic by himself or herself.

BACKGROUND ART

In the related art, many assist tools have been proposed with which a person to be applied applies an ointment, a medicine solution, or a cosmetic such as a sunblock or to affix a compress to the back and other sites that are out of the hands of the person to be applied, by himself or herself. In many assist tools, an application portion or an affixing portion for applying a liquid agent is formed at a scratching portion of a so-called backscratcher.

Patent Document 1 discloses one example of a medicine applicator of the related art. This publication provides a medicine application device with which a person applies a medicine to a lesion on a site such as the back that is difficult for the hands to reach, disinfects the lesion, wipes out pus, or wipes out blood by himself or herself. Namely, the medicine application device includes a handle and a medicine application portion at one end and the other end of a curved arm, respectively, and a stop plate for clamping is provided at an upper portion of the medicine application portion. During its use, tissue paper, gauze, absorbent cotton, or the like is laid under the medicine application portion, and is valley-folded along folding lines to wrap the tissue paper, gauze, absorbent cotton, or the like around the medicine application portion to fold both ends on an upper surface of the medicine application portion. Thereafter, the medicine application portion is covered with the stop plate for clamping, and the stop plate for clamping is fixed with an engaging claw.

Patent Document 2 discloses an example of a home medical assist tool of the related art that can easily affix or peel a medical patch to or off from a lesion of the back. In the medical assist tool described in this publication, a medical patch fixing tool has an integral structure in which an upper portion of a curved presser plate including a peeling portion at a lower side portion and an upper portion of a clamping plate including a claw are coupled to each other by a shaft including a spring. A support arm including a grip portion is structured to be connected by a support arm attachment portion, so that the support arm is attachable and detachable or is adjustable in angle.

CITATION LIST

Patent Document

Patent Document 1: Utility Model Registration No. 3176802

Patent Document 2: Japanese Unexamined Patent Publication No. 2001-129098

DISCLOSURE OF THE INVENTION

Problem to be Solved by the Invention

In the applicator of the related art described in Patent Document 1, instead of a scratching portion of a backscratcher, an application member is provided at an end portion of the applicator having a backscratcher shape. Then, a medicine is impregnated or applied to the application member and is transferred to the skin of a person to be applied. With such a configuration, the person to be applied can feel as if he or she applies a medicine to a site of the back that are out of the hands, with his or her own hands.

In the application device described in Patent Document 1, the medicine application portion having an elliptical shape is formed at a tip portion of the curved arm, and the stop plate for clamping that is rotatably provided at a base portion of the medicine application portion is rotated and pressed against tissue paper, cotton, gauze, or the like (hereinafter, also referred to as a treatment article) disposed to wrap the medicine application portion, and is fixed with the engaging claw provided at an end portion of the stop plate. In the application device, the treatment article such as tissue paper, cotton, or gauze can be reliably held, but the ratio or effective area of a portion used for application or wiping to the entirety of the treatment article is reduced. A standard product such as cut cotton or cotton puff that is a typical example of the treatment article is approximately 5 cm square, and when folded for clamping, the effective area that can be used for application or wiping is drastically reduced, so that the application time is lengthened while only a small portion of the skin can be treated (applied or wiped out) at once, and the size of a portion that are discarded without being used for treatment increases.

Patent Document 2 discloses that the medical patch is gripped and conveyed to the affixing portion by the clamping plate including the claw; and when the medical path reaches an affixing position, the gripping by the clamping plate is stopped, and the medical path is pressed and affixed by the presser plate. Since the medical assist tool described in Patent Document 2 is mainly intended to affix or peel the medical patch, in the case of applying a medicine using a treatment article such as cut cotton or cotton puff, no consideration is given to making the effective area used for applying the medicine as large as possible while reliably holding the cut cotton or cotton puff.

The invention is conceived in view of defects of an applicator of the related art with which a person to be applied applies a medicine solution to the back by himself or herself, and an object of the invention is to provide a medicine applicator configured by replacing a scratching portion of a backscratcher including an arm with an applicator for the medicine solution, which can attachably and detachably hold a disposable treatment article used for application and which can make an effective area used for applying the treatment article as large as possible.

Means for Solving Problem

In order to achieve the foregoing object, a medicine applicator of the invention is characterized by including: an arm extending in a longitudinal direction, of which one end portion side is used for gripping; and a pedestal portion disposed on the arm to be substantially parallel to the longitudinal direction of the arm. The medicine applicator is provided with a pair of pressing tools that attachably and detachably hold an application member on the pedestal portion, and the pair of pressing tools include a repulsive tool that generates a pressing force to bring the application member into contact with the pedestal portion.

In the invention, the "arm of which one end portion side is used for gripping" can also be paraphrased as, for example, the "arm on one end side of which a grip portion is formed".

In addition, "being substantially parallel" implies not only a state where the longitudinal direction of the arm and the pedestal portion are completely parallel to each other with no angle therebetween, but also a state where the longitudinal direction of the arm and the pedestal portion are mostly parallel to each other with a slight angle therebetween. Specifically, for example, "being substantially parallel" implies a state where the longitudinal direction of the arm and the pedestal portion are completely or mostly parallel to each other with an angle of approximately 0° to 7° therebetween.

In addition, the mode in which the application member is disposed includes, for example, a mode in which the application member is disposed to cover at least a part of a bottom surface side of the pedestal portion, and the like.

In addition, the "application member" implies any member as long as the member can hold an application agent such as a medicine or a cosmetic on a surface or inside and can be disposed on the pedestal portion. For example, the "application member" implies any one of cotton, fabric, non-woven fabric, and paper made of natural fibers, chemical fibers, and the like, and more specifically, implies, for example, any one of absorbent cotton such as cotton puff or cut cotton, tissue paper, gauze, and the like. In addition, the "application member" implies both a disposable member and a non-disposable member. In addition, the term "application member" can also be paraphrased as, for example, a "treatment article".

In addition, the "repulsive tool that generates a pressing force to bring the application member into contact with the pedestal portion" implies, more specifically, for example, the "repulsive tool that brings the application member into contact with the pedestal portion to generate a pressing force of the application member on the pedestal portion". In addition, the "pressing tool" implies, for example, clamping means such as clips that can clamp and hold the application member between the clamping means and the pedestal portion.

Therefore, this characteristic of the invention can be paraphrased as, for example, as follows.

A medicine applicator includes: an arm extending in a longitudinal direction, on one end side of which a grip portion is formed; and a pedestal portion disposed on the arm to be completely or mostly parallel to the longitudinal direction of the arm. The medicine applicator is provided with a pair of clips that attachably and detachably hold a disposable or non-disposable treatment article disposed to cover at least a part of a bottom surface side of the pedestal portion, and the pair of clips include a repulsive tool that brings the treatment article into contact with the pedestal portion to generate a pressing force of the treatment article on the pedestal portion.

Then, in this characteristic of the invention, the medicine applicator may include a finger contact portion for assisting an operation of the pressing tools or for operating the pressing tools.

In addition, "assisting an operation of the pressing tools" means assisting an opening and closing operation of the pressing tools by adjunctively using the finger contact portion in a case where a user tries to pinch knob portions of the pair of pressing tools with fingers but the opening and closing position of the pressing tools cannot be stably controlled when the pressing tools are opened and closed, and "operating the pressing tools" means only the same usage manner as a usage manner to be described in the following "modes for carrying out the invention" without pinching the knob portions of the pressing tools from the beginning. Namely, it is meant that the finger contact portion disposed to correspond to each of the pressing tools should be used when the pressing tools are opened and closed.

In this characteristic, the pedestal portion may be disposed at a substantially central portion of the arm, and both end portions of the arm may be portions used for gripping, namely, grip portions. In addition, the pedestal portion may be disposed at the other end portion of the arm or in the vicinity of the other end portion, and a secondary arm (in the present specification, also referred to as an "assist arm") that extends the arm may be attachably and detachably attached to the other end side of the arm to form a second grip portion at an end portion of the secondary arm (namely, to also use the end portion of the secondary arm for gripping).

In this characteristic, an end portion of each of the pair of pressing tools (clips or the like) may be formed as a knob portion, and the repulsive tool may be a coil spring (for example, a spring referred to as a kick spring, a torsional spring, a torsional coil spring, or the like) of which an end portion is in contact with a back surface side of the knob portion of each of the pressing tools (clips or the like) and of which a coil-shaped portion is wound around a shaft provided in the arm, and the repulsive tool may be a leaf spring of which both end portions are fixed to the back surface sides of the knob portions of the respective pressing tools (clips or the like). Further, the pedestal portion may be held to be swingable with respect to the arm.

Incidentally, "being wound" implies, for example, any one of a mode in which the repulsive tool is closely wound around an object such as a shaft or a pin while contacting the object, a mode in which the repulsive tool is wound around the object with a play (or a clearance) between the repulsive tool and the object, and the like.

In this characteristic, the repulsive tool may be fixed only to the pressing tools without being held by the arm.

In this characteristic, the arm may be provided with a male screw or a female screw, the secondary arm may be provided with a female screw or a male screw, and the secondary arm may be attachably and detachably attached to the arm by screwing the male screw or the female screw of the arm and the female screw or the male screw of the secondary arm.

In this characteristic, a groove may be disposed in the arm, and the repulsive tool may be disposed such that at least a part of the repulsive tool is fitted and held in the groove.

Incidentally, in this case, a mode of including a dowel-shaped protrusion or a shaft in the groove, or the like can be adopted.

In this characteristic, a grip portion that is different in shape and/or material from other portions of the arm may be provided at least on the one end portion side of the arm.

In this characteristic, a self-standing foot for holding the medicine applicator in a self-standing posture may be provided.

In this characteristic, the pressing tools each may include a regulating portion that regulates an operation of the repulsive tool.

The "regulating portion that regulates an operation of the repulsive tool" implies any portion as long as the portion can regulate the operation of the repulsive tool in a predetermined mode. For example, the regulating portion implies any one of a protrusion and recess portion that can regulate the repulsive tool so as to be slid along a predetermined trajectory (for example, a guide groove, a guide rib, or the like), a penetrated portion that can regulate the repulsive tool so as to pass through the penetrated portion within a predetermined range (for example, a passage hole, a slit, or the like), a shaft support portion that can regulate the repulsive tool so as to perform a predetermined rotation operation, and the like. Further, for example, among the specific modes of the regulating portion, the guide groove, the guide rib, the passage hole, the slit, and the like can also be paraphrased as a guide portion that guides the repulsive tool, namely, a guide portion that can guide the relative movement of the repulsive tool with respect to the pressing tools in a predetermined mode.

In addition, according to the invention, there is provided a medicine application kit including: the medicine applicator; and an application member disposed on the pedestal portion.

In addition, according to the invention, there is provided a pressing tool for medicine applicator that attachably and detachably holds an application member on the medicine applicator, the tool including: a shaft support portion swingably supported by the medicine applicator; a contact portion extending from the shaft support portion to come into contact with the application member; and a knob portion that extends from the shaft support portion in a direction different from a direction of the contact portion, to be used for gripping.

In this characteristic, the pressing tool for a medicine applicator may include a through-hole into which at least a part of the medicine applicator is insertable.

In this characteristic, the contact portion may include a non-slip portion including a protruding portion and/or a recessed portion.

Effect of the Invention

According to the invention, since the pressing tools (clamping means or the like) that are represented by clips and can attachably and detachably hold the application member (or the treatment article) are provided on the arm including the pedestal portion that is integrally formed with the arm, the application member can be easily attached and detached with a simple configuration. In addition, since the application member (or the treatment article) is simply held by the pressing tools (clamping means or the like) represented by clips, a reduction in the effective area of the application member (or the treatment article) used for applying a medicine or the like can be suppressed.

MODES FOR CARRYING OUT THE INVENTION

Figure 1A:
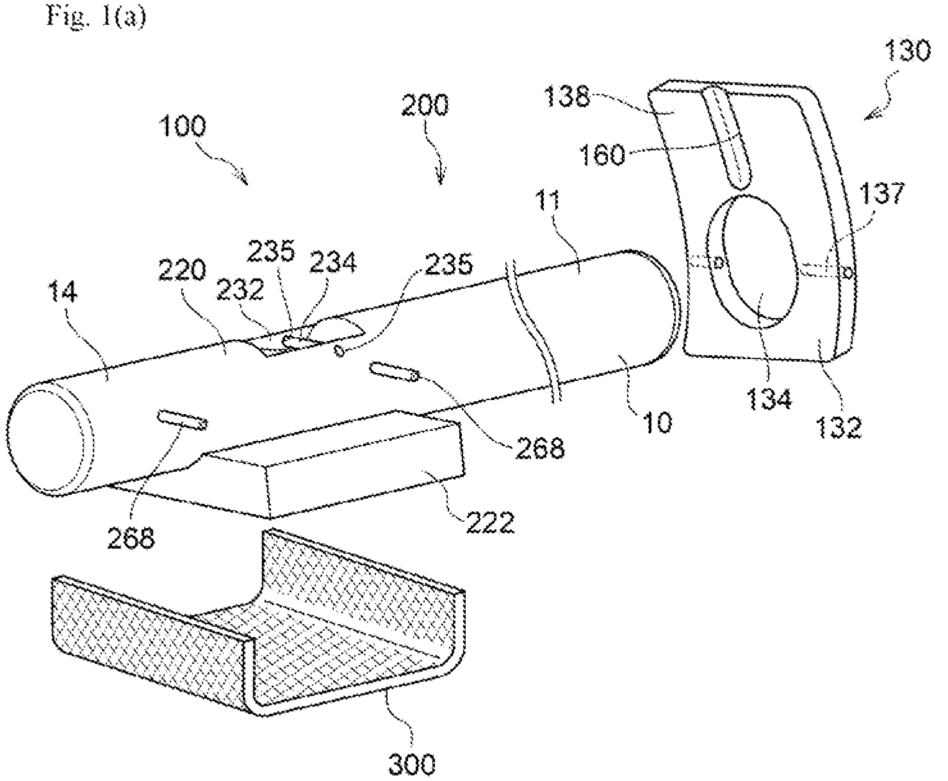
FIGS. 1(*a*) to 1(*c*) are an exploded perspective view, a top view, and a side view of one embodiment of a medicine applicator according to the invention, respectively.
Figure 1B:
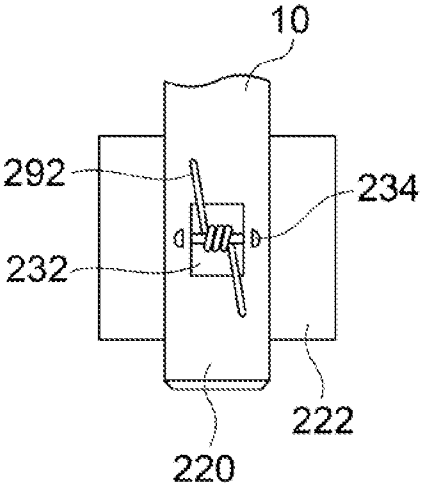
Figure 1C:
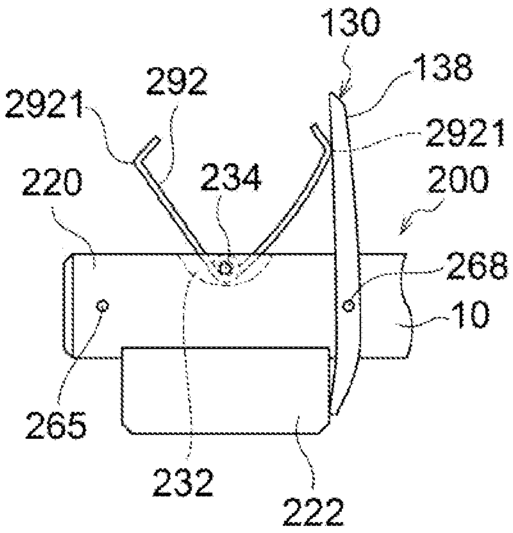
Figure 2A:
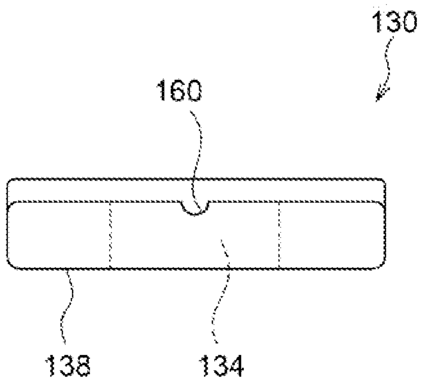
FIGS. 2(*a*) to 2(*c*) are a top view, a side view, and a front view illustrating a pressing tool of the medicine applicator illustrated in FIGS. 1(*a*) to 1(*c*), respectively, and FIG. 2(*d*) is a side view describing an operation of the pressing tool.
Figure 2B:
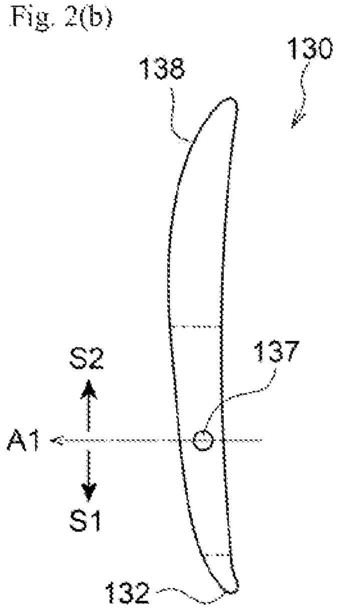
Figure 2C:
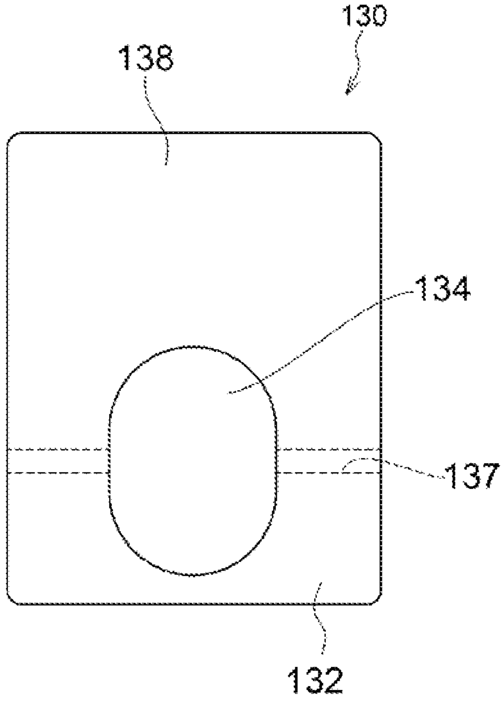
Figure 2D:
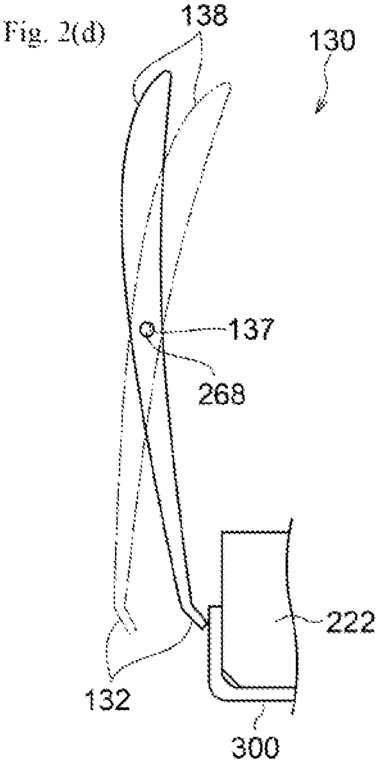

Hereinbelow, one embodiment of a medicine applicator according to the invention will be described with reference to the drawings. FIG. 1(*a*) is an exploded perspective view of one embodiment of a medicine applicator 100 according to the invention, FIG. 1(*b*) is a partial top view of the medicine applicator 100 illustrated in FIG. 1(*a*) and FIG. 1(*c*) is a partial side view of the medicine applicator 100 illustrated FIG. 1(*a*).

The medicine applicator 100 includes an arm 10 extending in a longitudinal direction, of which one end portion side is used for gripping; and a pedestal portion 222 disposed on the arm 10 to be substantially parallel to the longitudinal direction of the arm 10. The medicine applicator 100 is provided with a pair of pressing tools 130 that attachably and detachably hold an application member 300 on the pedestal portion 222, and the pair of pressing tools 130 include a repulsive tool 292 that generates a pressing force to bring the application member 300 into contact with the pedestal portion 222.

The medicine applicator 100 includes an applicator body 200 including the arm 10 having a rod shape extending to approximately 30 to 70 cm, desirably, approximately 40 to 60 cm long, and the pedestal portion 222 disposed on the arm 10 to be substantially parallel to the longitudinal direction of the arm 10. For example, when both the arm 10 and the pedestal portion 222 are made of synthetic resin, the applicator body 200 can be integrally formed by die forming, injection forming, or the like. For example, when the arm 10 is made of wood, lightweight metal such as aluminum, or the like, the pedestal portion 222 may be fixed to and integrated with the arm 10 made of wood, lightweight metal, or the like, with screws or the like. In addition, for example, the pedestal portion 222 may be fixed to and integrated with the arm 10 made of synthetic resin, with screws or the like. In addition, the pedestal portion 222 may be connected to and integrated with the arm 10 through a connecting material (not illustrated) such as a spacer. Further, in addition to a mode in which the arm 10 and the pedestal portion 222 are integrated, it is also possible to adopt a mode in which the arm 10 and the pedestal portion 222 are configured to be attachable and detachable by joining using screws or the like as in the above-described example and the size of the pedestal portion 222 can be changed, or a mode in which the cleaning of very small parts is facilitated. Incidentally, a portion at which the arm 10 and the pedestal portion 222 are joined or integrated forms a centralization portion 220 including a columnar body portion forming a part of the arm 10 in an axial direction, and the pedestal portion 222. More specifically, the centralization portion 220 is a portion of the arm 10 including the pressing tools (clips) 130, an attachment shaft (holding shaft) 268 of the pressing tools (clips) 130, the pedestal portion 222, a repulsive tool, and a repulsive tool-holding portion (including holding means such as the attachment shaft 268).

A grip portion 11 that a person to be applied grips by himself or herself is formed on the one end portion side of the arm 10. A length of the grip portion is approximately 10 cm to 25 cm or approximately 10 cm to 18 cm. In the medicine applicator 100 of the present embodiment, since a structure is adopted in which a scratching portion of a backscratcher is replaced with the applicator body 200, the arm 10 is slightly curved for convenience of the application of a medicine to the back of the person to be applied. However, the arm 10 may have a shape that is curved not only in one direction but also in a plurality of directions (for example, a shape that is curved in a substantially S shape, or the like) or, for example, may extend linearly.

A side of the arm 10 of the applicator body 200 opposite the grip portion 11 is an extending portion 14 that extends outward from the pedestal portion 222 not to affect an operation of the pedestal portion 222. Typically, the extending portion 14 is approximately 1 cm to 5 cm long, but as in an embodiment to be described later, when the medicine applicator 100 is gripped with both hands, the extending portion 14 is replaced with an assist arm 400 extending approximately 30 cm to 70 cm (or approximately 10 to 50 cm), and a second grip portion 11 is disposed (formed) at an end portion of the assist arm 400. The extending portion 14 may or may not penetrate through a through-hole 134 of the pressing tool 130 to be described later.

In order to reliably hold the application member 300 on the pedestal portion 222, additionally, the pair of pressing tools 130 each having a substantially rectangular outer shape (laterally sectional shape of the pressing tools 130 may be an arch shape that easily fits the shape of fingers, a substantially S shape, or a crank shape) are swingably and substantially symmetrically provided on the applicator body 200 in an axial direction of the centralization portion 220 and in the vicinity of front and rear positions of the pedestal portion 222. A configuration of the pressing tools 130 is also illustrated in FIGS. 2(*a*) to 2(*d*). FIGS. 2(*a*) to 2(*c*) are a top view, a side view, and a front view of the pressing tool 130, respectively, and FIG. 2(*d*) is a side view describing an operation of the pressing tool 130. The pressing tool 130 is formed in a substantially oblong plate shape that is slightly long in one direction (up-down direction in FIGS. 2(*b*) to 2(*d*)). The through-hole 134 having a substantially oval shape that is slightly long along a length direction of the pressing tool 130 opens on a front surface of the pressing tool 130 at a position that is offset to one end of the pressing tool 130 in the length direction (lower end in FIGS. 2(*b*) to 2(*d*)) and that is at a substantially center in a width direction, and prevents the pressing tool 130 from interfering with the extending portion 14, the centralization portion 220, or the arm 10 when the pressing tool 130 is attached in the vicinity of the pedestal portion 222 of the applicator body 200. Namely, the pressing tool 130 has the through-hole 134 through which at least a part of the medicine applicator 100 can penetrate.

A hole 137 extending in the width direction to penetrate through the pressing tool 130 from the vicinity of a central portion of the through-hole 134 of the pressing tool 130 in the length direction to both long side portions of the pressing tool 130 is provided for attaching the pressing tool 130 to the centralization portion 220. The hole 137 is fitted to the attachment shaft 268 inserted into an attachment hole 265 of the centralization portion 220 to be described later. When viewed from the side, in the pressing tool 130, when an imaginary line A1 extending from a center point of the hole

137 toward the front surface of the pressing tool 130 to perpendicularly intersect the pressing tool 130 is regarded as a cutting line as illustrated in FIG. 2(*b*), a knob portion 138 is formed on a counter pedestal portion 222 side (upper side in the drawing) S2 opposite a pedestal portion 222 side (lower side in the drawing) S1 with respect to the imaginary line A1, and a contact portion 132 in which a tip portion is bent in a direction of the pedestal portion 222 is formed on the pedestal portion 222 side S1. Namely, the pressing tool 130 is a pressing tool for a medicine applicator that attachably and detachably holds the application member 300 on the medicine applicator 100, and that includes the hole 137 that is a shaft support portion swingably supported by the medicine applicator 100; the contact portion 132 extending from the shaft support portion to be able to come into contact with the application member 300; and the knob portion 138 that extends from the shaft support portion in a direction different from a direction of the contact portion 132, to be used for gripping.

As illustrated in FIGS. 1(*a*) and 2(*a*), a guide rail 160 having a groove shape with a substantially semi-circular cross-section and extending linearly from the vicinity of the through-hole 134 toward the other end of the pressing tool 130 in the length direction (upper end in FIG. 1(*a*)) is formed in a back surface (pedestal portion 222—side surface) of the pressing tool 130. Namely, in one side surface of the pressing tool 130, toward which the tip portion of the contact portion 132 is bent, the guide rail 160 having a groove shape with a substantially arc-shaped cross section is provided in the pressing tool 130 to extend linearly from a substantially center of a short side forming the other end of the pressing tool 130 in the length direction (upper end in FIG. 1(*a*)) to a position in the vicinity of one end of the through-hole 134 in the length direction (upper end in FIG. 1(*a*)) along the length direction of the pressing tool 130 (up-down direction in FIG. 1(*a*)). The guide rail 160 is formed with a width and depth such that a bent portion 2921 of the repulsive tool (kick spring) 292 to be described later can be fitted into the guide rail 160 with a slight margin (play). It is desirable that at least a surface (inner surface) of the guide rail 160 has, for example, a good sliding characteristic (low coefficient of friction, high wear resistance, or the like). For this reason, for example, at least the surface (inner surface) of the guide rail 160 may be made of resin such as polyacetal, polyamide, or polytetrafluoroethylene (PTFE) or other materials having a good sliding characteristic, or depending on the material of the pressing tool 130, a surface layer made of a material having a good sliding characteristic, as described above may be provided on the surface (inner surface) of the guide rail 160. In addition, in the embodiment, a mode is adopted in which the guide rail is required, but the invention also corresponds to a mode in which the guide rail is not used.

A pair of the attachment holes 265 that are substantially symmetrically disposed in the axial direction in a side surface of the centralization portion 220 of the applicator body 200 (a pair in one side surface of both right and left side surfaces) are disposed in both the right and left side surfaces, and the attachment shafts 268 are inserted and attached to the respective attachment holes 265. The attachment shafts 268 are fitted to the respective holes 137, and the pressing tools 130 are swingably attached to the centralization portion 220. As illustrated in FIG. 1(*c*), end portions (both end portions) of the repulsive tool (kick spring) 292 are bent inward (coil side) in a hook shape, so that the bent portions 2921 each having a shape that is locally bent in a curved shape are formed, and the bent portions 2921 may press back surface sides of the knob portions 138 of the respective pressing tools 130 or may extend in a shape where the end portions of the repulsive tool are processed not to cause resistance between the end portions of the repulsive tool and the pressing tools when the pressing tools are operated, for example, linearly or in an arc shape, or tips of the repulsive tool 292 may be processed into a substantially spherical shape or the like. At this time, the bent portions 2921 of the repulsive tool (kick spring) 292 are fitted into the respective guide rails 160 and press the back surface sides of the knob portions 138 of the respective pressing tools 130 while sliding in the respective guide rails 160. Here, for example, if the pressing tools each are not provided with a portion such as the guide rail, the repulsive tool is offset (deviates) with respect to the pressing tools in a direction other than a desired direction, and as a result, a pressing force of the repulsive tool cannot be sufficiently transmitted to the pressing tools. On the other hand, according to a configuration in which an operation of the repulsive tool (kick spring) 292 is regulated by the guide rails 160 (regulating portions) as in the present embodiment, the operation of the repulsive tool can be more reliably and easily performed, and accordingly, a pressing force of the repulsive tool can be reliably and sufficiently transmitted to the pressing tools. In addition, particularly, since the bent portions 2921 each have a shape that is locally bent in a curved shape as in the above-described example, and slide in the respective guide rails 160 on outer sides of the bent portions 2921, the bent portions 2921 can more smoothly slide. The attachment shafts 268 are attached and fixed to the respective attachment holes 265, but the attachment shafts 268 may be rotatably fitted to the respective attachment holes 265, and the attachment shafts 268 may be fixed to the holes 137 of the respective pressing tools 130 through welding, caulking, brazing, bonding, or the like.

A groove 232 having various shapes such as a substantially semi-circular shape in a side view, a quadrilateral shape, an oblong shape, and an elliptical shape in a top view, and a circular column shape in a perspective view is disposed in the axial direction of an upper peripheral surface of the centralization portion 220 (length direction of the arm 10), a hole 235 passing through the groove 232 in a radial direction is provided in the centralization portion 220, and a presser pin 234 is provided across the groove 232 using the hole 235. The presser pin 234 may be configured to be inserted into the hole 235 and to be fixed by a frictional force, or an end portion of the presser pin 234 after being fitted may be subjected to a process of preventing fall out, such as caulking. In addition, a long screw with a head may be used as the presser pin 234 and combined with one side of the through-hole 235 using a nut. A coil portion of the repulsive tool (kick spring) 292 is wound around the presser pin 234 (refer to FIGS. 1(*b*) and 1(*c*)), in other words, the repulsive tool (kick spring) 292 is disposed such that at least a part of the repulsive tool (kick spring) 292 is fitted and held in the groove 232, so that the repulsive tool (kick spring) 292 that is disposed in a pre-biased state to press the back surface sides of the knob portions 138 of the pressing tools 130 can be reliably held by the centralization portion 220.

An action of the repulsive tool (kick spring) 292 that is pre-biased and attached, and an operation of the pressing tools caused by the action will be described in detail with reference to FIG. 1(*c*). FIG. 1(*c*) illustrates a state where the repulsive tool (kick spring) 292 that is a spring as a repulsive tool for pressing tools and one (right in the drawing) pressing tool 130 are attached and the other (left in the drawing) pressing tool 130 is removed. A portion of the repulsive tool (kick spring) 292 that is formed in a coil shape is wound around the presser pin 234, is held by the centralization portion 220, and is restricted in movement. The bent portion 2921 of the repulsive tool (kick spring) 292 is slidably fitted into the guide rail 160 of the pressing tool 130 without being fixed, and the back surface side of the knob portion 138 of the pressing tool 130 that is swingably held by the centralization portion 220 is pressed by an elastic force (restoring force) of the repulsive tool (kick spring) 292. As illustrated in FIG. 2(*d*), the pressing tool 130 pressed by the elastic force rotates around the attachment shaft 268 (hole 137) based on the principle of leverage, and the contact portion 132 that is a counter knob portion 138 side comes into contact with and is pressed against the pedestal portion 222 through (or without intervention of) the application member 300, so that the rotational movement of the pressing tool 130 is stopped. The elastic force (restoring force) of the repulsive tool (kick spring) 292 that is pre-biased and attached continues to act under the above-described conditions unless any one of the components is deformed or damaged, and is maintained without being released. The elastic force (restoring force) of the repulsive tool (kick spring) 292 acts as a force (rotational moment) that presses the back surface side of the knob portion 138 of the pressing tool 130 to rotate the pressing tool 130.

The knob portions 138 and 138 of the pressing tools 130 that are substantially symmetrically provided with back surfaces facing each other are rotated and separated from each other by the elastic force (restoring force) of the repulsive tool (kick spring) 292. Accordingly, the contact portions 132 that are lower portions below swing centers (holes 137) of the respective rotating pressing tools 130 approach each other and abut on the pedestal portion 222 through (or without intervention of) the application member 300. The application member 300 attached to the side surface and a bottom surface of the pedestal portion 222 is pressed against the pedestal portion 222 and is clamped by the contact portions 132. This state is a state where the application member 300 is held by the applicator body 200. In order to attach and detach the applicator body 200 and the application member 300 to and from each other, a force against the elastic force (restoring force) of the repulsive tool (kick spring) 292 is applied to the repulsive tool (kick spring) 292 through the knob portions 138. Namely, the knob portions 138 of the pair of pressing tools 130 are pinched by the fingers to approach each other, and the pressing tools 130 are swung. The knob portions 138 are pinched by the fingers with a force stronger than the elastic force (restoring force) of the repulsive tool (kick spring) 292, so that the knob portions 138 rotate around the respective attachment shafts 268 (holes 137) to approach each other. Accordingly, each of the contact portions 132 and 132 that are the lower portions below swing center axes (holes 137) of the respective rotating pressing tools 130 separates from the pedestal portion 222 to generate a space for attaching and detaching the application member 300. This state is a state where the application member 300 is released from the applicator body 200.

The application member 300 is disposed on a bottom surface side of the pedestal portion 222. More specifically, as illustrated in FIG. 2(*d*), the application member 300 is held by being disposed to cover a bottom surface portion of the pedestal portion 222 and to wrap around side surface portions and by being pressed against both surface portions of the pedestal portion 222 and clamped by the contact portions 132 of the pair of pressing tools 130 from both sides. However, as the disposition of the application member 300, a mode other than such a mode can also be adopted. For example, a mode may be adopted in which the application member 300 covers a part of the bottom surface portion of the pedestal portion 222 instead of covering the entirety thereof. In other words, as the disposition of the application member 300, a mode can be adopted in which the application member 300 covers the entirety or a part (at least a part) of the bottom surface portion of the pedestal portion 222. In addition, for example, a mode can also be adopted in which the application member is disposed to cover only (at least a part of) the bottom surface portion without reaching the side surface portions of the pedestal portion and a peripheral edge portion of the application member is pressed against the bottom surface portion of the pedestal portion and is held by the contact portions of the pressing tools (not illustrated). In the case of this mode, for example, when the pressing tools are formed in a shape in which tip portions of the pressing tools are bent further inward (knob portion side), the bottom surface portion of the pedestal portion can be pressed by the tip portions.

As the application member 300, any one of cotton puff, cut cotton, paper, or fabric which is soaked with a medicine or to which a paste-like medicine is applied can also be used. Since the size of the cotton puff that is commercially available is 60×80, 58×70, 50×60, 55×70, 50×65, or the like (dimensional unit is mm), namely, has a short side of approximately 50 to 60 mm and a long side of approximately 60 to 80 mm, and the size of the cut cotton is 40×40, 50×60, 50×50, 50×70, 56×80, 70×70, or the like (dimensional unit is mm), namely, has a short side of approximately 40 to 70 mm and a long side of approximately 40 to 80 mm, the size of the pedestal portion 222, namely, the dimensions of sides of the bottom surface may be approximately equal to or less than the dimensions of sides of the application member 300. Specifically, a length of the short side (axial direction of the arm 10) is approximately 30 to 60 mm, and a length of the long side (radial direction of the arm 10) is approximately 30 to 80 mm. However, since the application member that is commercially available is generally expandable and contractable, the dimensions of the sides of the bottom surface of the pedestal portion 222 may be larger than the above-described values.

Incidentally, the medicine applicator 100, and the application member 300 disposed on the pedestal portion 222 can form a medicine application kit.

Figure 3A:
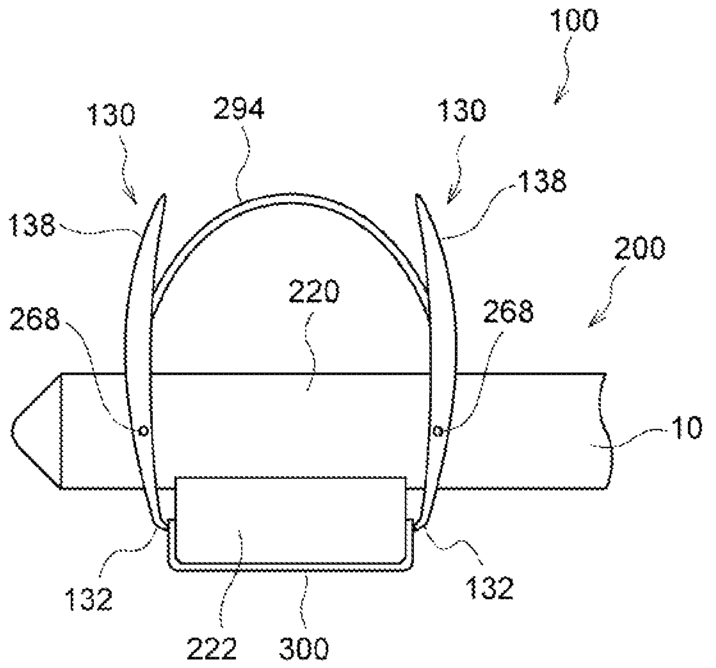
FIGS. 3(*a*) and 3(*b*) are side views of several modification examples of a clip according to the invention.
Figure 3B:
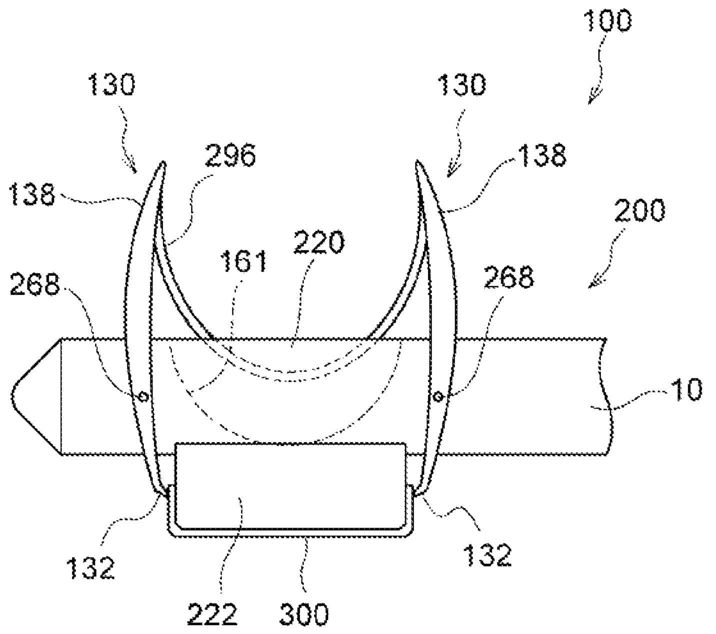
Figure 4A:
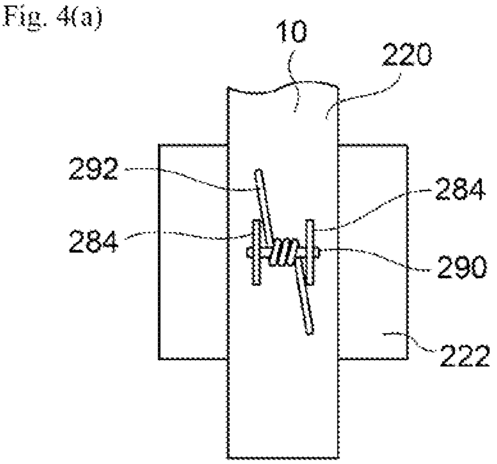
FIGS. 4(*a*) to 4(*e*) illustrate views for describing modification examples of a repulsive tool according to the invention, FIGS. 4(*a*) to 4(*c*) are a top view, a front view, and a side view of a clip portion using a kick spring, respectively, and FIGS. 4(*d*) and 4(*e*) are a front view and a side view of a clip portion using a leaf spring, respectively.
Figure 4B:
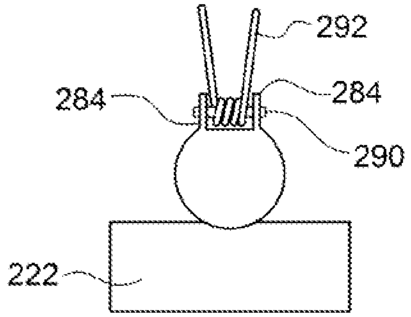
Figure 4C:
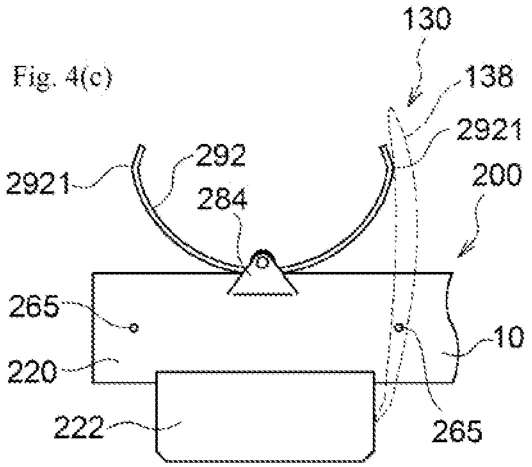
Figure 4D:
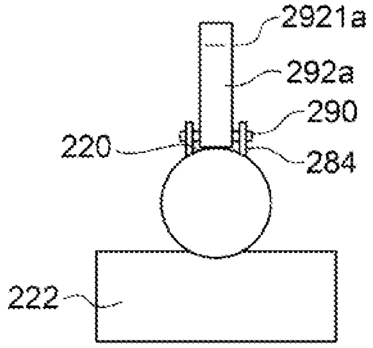
Figure 4E:
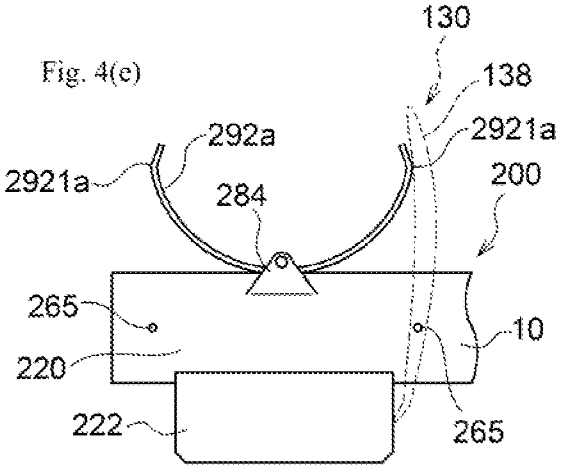

Next, FIGS. 3(*a*) to 4(*e*) illustrate modification examples of the repulsive tool used for the pressing tools 130 according to the invention.

Incidentally, in each modification example provided below, the same members or portions as those of the embodiment illustrated in FIGS. 1(*a*) to 1(*c*) are denoted by the same letter or numerals, and basically, a description thereof will not be repeated unless otherwise necessary.

FIGS. 3(*a*) and 3(*b*) illustrate modification examples in which the repulsive tool that is a kick spring is changed to repulsive tools (leaf springs) 294 and 296. FIG. 3(*a*) is an example in which the repulsive tool (leaf spring) 294 disposed to protrude upward is used, and FIG. 3(*b*) is an example in which the repulsive tool (leaf spring) 296 disposed to protrude downward is used as a repulsive tool. In the modification example illustrated in FIG. 3(*b*), a clearance hole 161 is formed in a portion of the centralization portion 220 of the arm 10 immediately below the repulsive tool (leaf spring) 296 such that the portion does not interfere with the repulsive tool (leaf spring) 296. In the present modification example, the repulsive tool is fixed only to the pressing tools 130 without being held by the centralization portion 220. Specifically, the repulsive tool can be configured simply by fixing both end portions of the repulsive tool (leaf spring) 294 or 296 to the back surface sides of the knob portions 138 of the pair of respective pressing tools 130 in a pre-biased state without holding the repulsive tool on the centralization portion 220. Namely, both the end portions of the repulsive tool (leaf spring) 294 or 296 are fixed to the back surface sides of the knob portions 138 and 138 of the respective pressing tools 130 that are substantially symmetrically disposed with the back surfaces facing each other. The pressing tools 130 are rotated by an elastic force (restoring force) of the repulsive tool (leaf spring) 294 or 296, and the knob portions 138 and 138 of the pressing tools 130 are separated from each other.

Incidentally, in the modification example illustrated in FIG. 3(*b*), the clearance hole 161 is formed as described above, but for example, the repulsive tool (leaf spring) disposed to protrude downward may be provided to avoid the centralization portion of the arm (in a positional relationship illustrated in FIG. 3(*b*), the repulsive tool (leaf spring) is disposed at the position of both end portions of the pressing tools 130 in the width direction, namely, the position of front and rear end portions of the pressing tools 130 in the drawing to be laterally offset from the centralization portion 220), and according to this configuration, the clearance hole can be eliminated.

As a specific example of attaching the repulsive tool (leaf spring) 294 or 296 to the knob portions 138, when the knob portions 138 and the repulsive tool (leaf spring) 294 or 296 are made of materials that can be melted into each other, the knob portions 138 and the repulsive tool (leaf spring) 294 or 296 can be attached to each other by welding, bonding, or the like. When the knob portions 138 and the repulsive tool (leaf spring) 294 or 296 are made of materials that cannot be melted into each other, the knob portions 138 and the repulsive tool (leaf spring) 294 or 296 can be attached to each other by tightening, tacking, bonding, or the like using an adhesive agent, riveting, screwing, brazing, or the like. Alternatively, when holders into which the end portions of the repulsive tool (leaf spring) 294 or 296 can be fitted are disposed on the back surface sides of the respective knob portions 138, and the end portions of the repulsive tool (leaf spring) 294 or 296 are inserted into the respective holders, the end portions of the repulsive tool (leaf spring) 294 or 296 can be reliably fixed to the respective knob portions 138. Incidentally, the repulsive tool (leaf spring) 294 or 296 may be reliably fixed to the holders by additionally riveting or brazing the fitted portions. An action of the elastic force (restoring force) of the repulsive tool applied to the pressing tools, and an operation of the pressing tools caused by the action are the same as the contents illustrated in FIGS. 1(*a*) to 2(*d*).

Incidentally, both the end portions of the repulsive tool (leaf spring) 294 or 296 may be fixed to the respective pressing tools 130 as described above, but in addition to this mode, for example, both the end portions of the repulsive tool may be supported by shafts extending along a width direction of the leaf spring (or the width direction of the pressing tools), and rotatably attached to the respective pressing tools, and according to this configuration, the pressing tools can be more smoothly operated.

FIGS. 4(*a*) to 4(*e*) illustrate an example in which the attachment position and the shape of the repulsive tool (kick spring) 292 are changed, and an example in which the repulsive tool is changed to a leaf spring, FIG. 4(*a*) is a top view of the applicator body 200 including the repulsive tool (kick spring) 292, FIG. 4(*b*) is a front view of the applicator body 200, FIG. 4(*c*) is a side view of the applicator body 200, FIG. 4(*d*) is a front view of the applicator body 200 including a repulsive tool (leaf spring) 292*a*, and FIG. 4(*e*) is a side view thereof. In order to clearly illustrate the repulsive tool (kick spring) 292 and the repulsive tool (leaf spring) 292*a*, in these drawings, the pressing tools 130 are omitted (except that one is illustrated by a broken line in FIGS. 4(*c*) and 4(*e*)).

Specifically, two flake-shaped holding portions 284 and 284 are integrally formed on the upper peripheral surface of the centralization portion 220 of the applicator body 200 to stand in a posture parallel to the length direction of the arm 10 with surfaces of the holding portions 284 and 284 being spaced from and facing each other. A hole is formed in each of the holding portions 284, and a shaft 290 is inserted and fixed to the holes. The coil portion of the repulsive tool (kick spring) 292 is wound around the shaft 290, and the repulsive tool (kick spring) 292 is disposed in a pre-biased state. The bent portions 2921 are formed at both the end portions of the repulsive tool (kick spring) 292, and the bent portion 2921 presses the back surface side of the knob portion 138 of the pressing tool 130 while being fitted and sliding in the guide rail 160 (not illustrated in FIGS. 4(*a*) to 4(*e*)) of the pressing tool 130 illustrated by broken line. On the other hand, similarly to the embodiment illustrated in FIGS. 1(*a*) to 1(*c*), the pressing tool 130 is swingably held by the attachment shaft 268 inserted into the attachment holes 265 disposed in the respective right and left side surfaces of the centralization portion 220. Also in the present modification example, similarly to the embodiment illustrated in FIGS. 1(*a*) to 1(*c*), the pressing tools 130 reliably clamp the application member 300 attached to the pedestal portion 222, so as to be attachable and detachable. An action between the pressing tools (clips or the like) and the repulsive tool that is the repulsive tool (kick spring) 292 that presses the back surface sides of the knobs 138 of the pressing tools 130, and an operation of the pressing tools caused by the action are the same as those of the embodiment and the modification examples.

In the modification example illustrated in FIGS. 4(*d*) and 4(*e*), similarly to FIGS. 4(*a*) to 4(*c*), the holding portions 284 of the repulsive tool are formed, but since the repulsive tool is a leaf spring, the coil portion of the repulsive tool (kick spring) is not wound around the shaft 290, and the repulsive tool (leaf spring) 292*a* that is a repulsive tool simply passes between the upper peripheral surface of the centralization portion 220 of the applicator body 200 and the shaft 290. The repulsive tool (leaf spring) 292*a* passes between the upper peripheral surface of the centralization portion 220 of the applicator body 200 and the shaft 290 to extend in the axial direction of the centralization portion 220, and is disposed in a pre-biased state to press the back surface side of the knob portion 138 of the pressing tool 130. A guide rail having a groove shape and having a width and a depth corresponding to the width and the thickness of the repulsive tool (leaf spring) 292*a* is formed on the back surface side of the knob portion 138 of the pressing tool 130 to extend up and down (not illustrated), and a bent portion 2921*a* of the repulsive tool (leaf spring) 292*a* is fitted and slides in the guide rail. In order to prevent separation from the applicator body 200 caused by frictional movement, the repulsive tool (leaf spring) 292*a* may be processed into a bent shape in the vicinity of the shaft 290. An action between the pressing tools and the repulsive tool that is the repulsive tool (leaf spring) 292*a* that presses the back surface sides of the knob portions 138 of the pressing tools 130, and an operation of the pressing tools caused by the action are the same as those of the embodiment and the modification examples.

Figure 5A:
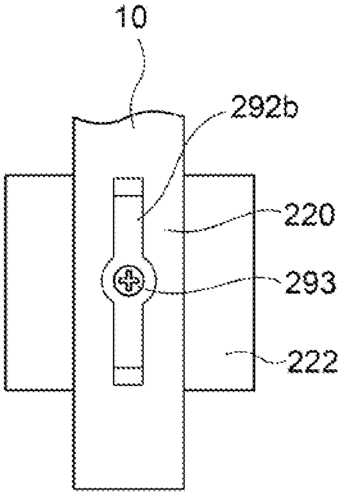
FIGS. 5(*a*) and 5(*b*) illustrate views for describing further another modification example of the repulsive tool illustrated in FIGS. 4(*a*) to 4(*e*), and FIGS. 5(*a*) and 5(*b*) are a top view and a side view of a clip portion, respectively.
Figure 5B:
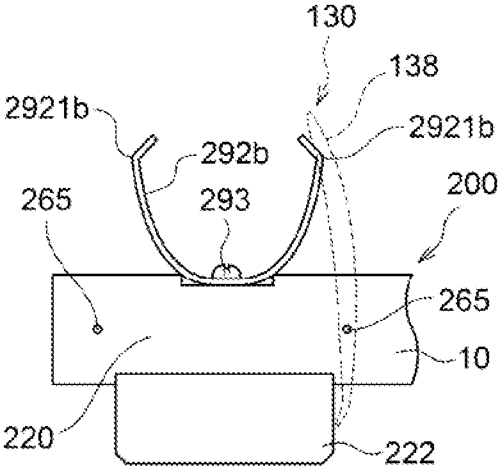

FIGS. 5(*a*) and 5(*b*) are a modification example in which the holding portions 284 are omitted in the modification example of FIGS. 4(*d*) and 4(*e*). A fastening hole is formed at a substantially center of a repulsive tool (leaf spring) 292*b*. The fastening hole or a fastening shaft is disposed in the upper peripheral surface of the centralization portion 220, and a fastener 293 fixes the repulsive tool (leaf spring) 292*b* to the centralization portion 220 using the hole provided in the repulsive tool (leaf spring) 292*b*. The repulsive tool (leaf spring) 292*b* is formed with a length that presses the back surface sides of the knob portions 138 of the pair of pressing tools 130, extends from a listening hole portion in the axial direction of the centralization portion 220, and is disposed in a pre-biased state to press the back surface sides of the knob portions 138 of the pressing tools 130 while the bent portions 2921*a* are fitted and slid in guide rails (not illustrated). An action between the pressing tools and the repulsive tool that is the repulsive tool (leaf spring) 292*b* that presses the back surface sides of the knob portions 138 of the pressing tools 130, and an operation of the pressing tools 130 caused by the action are the same as those of the embodiment and the modification examples.

Figure 6A:
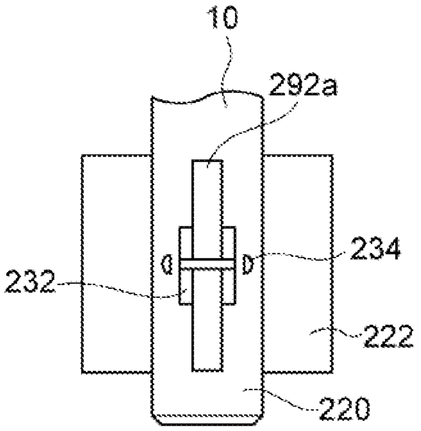
FIGS. 6(*a*) and 6(*b*) are a top view and a side view, respectively, when a repulsive tool (leaf spring) is used instead of the repulsive tool illustrated in FIGS. 1(*a*) to 1(*c*)
Figure 6B:
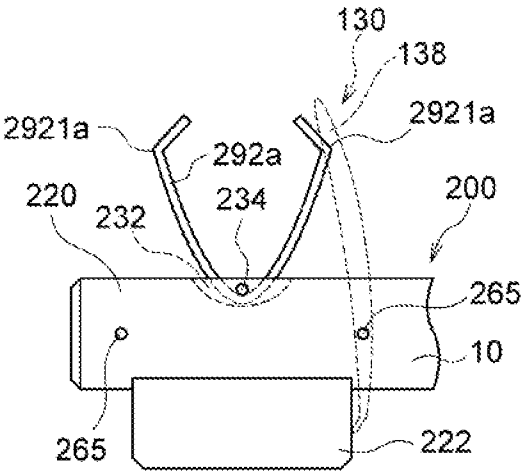

FIGS. 6(*a*) and 6(*b*) illustrate another modification example in which the repulsive tool is held by the centralization portion 220 of the applicator body 200. FIGS. 6(*a*) and 6(*b*) are a top view and a side view, respectively, when the repulsive tool (leaf spring) 292*a* is used as a repulsive tool.

Similarly to the embodiment illustrated in FIGS. 1(*a*) to 1(*c*), the groove 232 is formed. Namely, the groove 232 having a substantially semi-circular shape is disposed in the axial direction of the upper peripheral surface of the centralization portion 220 (length direction of the arm 10), the hole 235 passing through the groove 232 in the radial direction is provided in the centralization portion 220 at the position of a substantially center of the groove, and the presser pin 234 is provided across the groove 232 using the hole 235. The repulsive tool (leaf spring) 292*a* passes between the presser pin 234 and a bottom surface of the groove 232, in other words, the repulsive tool (leaf spring) 292*a* is disposed such that at least a part of the repulsive tool (leaf spring) 292*a* is fitted and held in the groove 232, so that the repulsive tool (leaf spring 292*a* disposed in a pre-biased state to press the back surface sides of the knob portions 138 of the pressing tools 130 can be reliably held by the centralization portion 220. An action between the pressing tools and the repulsive tool that is the repulsive tool (leaf spring) 292*a* that presses the back surface sides of the knob portions 138 of the pressing tools 130, and an operation of the pressing tools caused by the action are the same as those of the embodiment and the modification examples. The end portions of each of the leaf springs of FIGS. 4(*d*) and 4(*e*), FIGS. 5(*a*) and 5(*b*), and FIGS. 6(*a*) and 6(*b*) that are the embodiment may be fixed to or held by the back surface sides of the knob portions 138 of the respective pressing tools 130 as in the modification example of FIGS. 3(*a*) and 3(*b*).

(Other Modification Examples)

(1)

Figure 7:
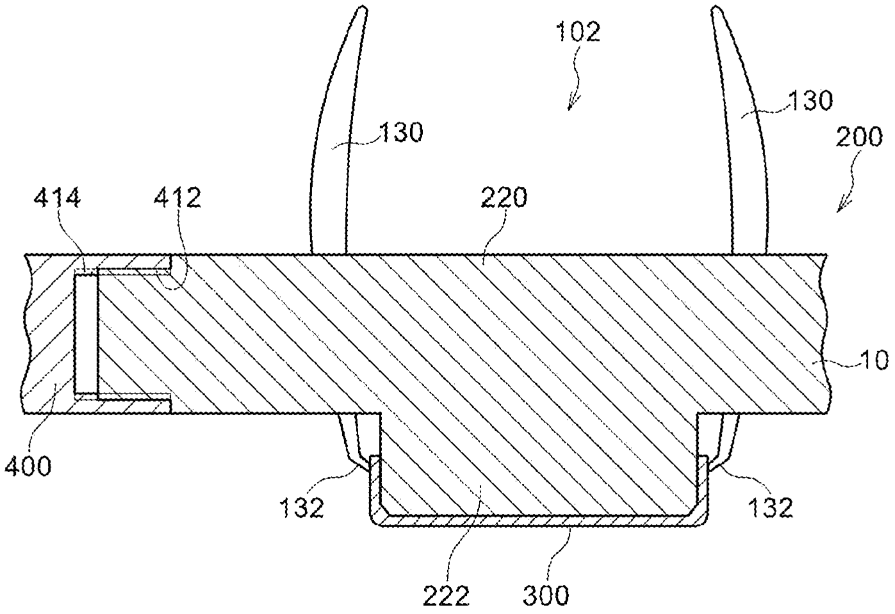
FIG. 7 is a side cross-sectional view of a modification example of the medicine applicator according to the invention.

Next, FIG. 7 illustrates a modification example of the medicine applicator 100 according to the invention. In the present modification example, the configuration of the arm 10 is changed, and any applicator body 200 illustrated in the embodiment and in the examples can also be applied. FIG. 7 is a side cross-sectional view of a medicine applicator. In the embodiment and each modification example, the extending portion 14 that is relatively short is provided at a counter grip portion—side end portion of the applicator body 200, but the assist arm 400 including a grip portion (not illustrated) is added in the axial direction of the arm 10. Namely, the assist arm 400 and the arm 10 form a medicine applicator 102, so that a user can grip the grip portions 11 provided at both end portions of the assist arm 400 and the arm 10, and move the applicator body 200 on the skin in a dry fabric rubbing manner. Accordingly, the operability of the applicator body 200 is improved. For this reason, the configuration is such that the pedestal portion 222 is disposed at the other end portion (counter grip portion—side end portion) of the arm 10 or in the vicinity thereof, a male screw 412 is formed at the counter grip portion—side end portion of the arm 10, and a female screw 414 is formed at an end portion of the assist arm 400, and the medicine applicator 102 of a double grip type can be configured by attachably and detachably attaching the assist arm 400 to the arm 10 through screwing of the male screw 412 and the female screw 414. According to the present modification example, the medicine applicator 102 can be gripped and used with both hands. In addition, needless to say, in the medicine applicator 102 according to the present modification example, the assist arm 400 and the arm 10 are disassembled, and the arm 10 in a state where the assist arm 400 is not added can also be used in the same manner as the mode illustrated in FIGS. 1(*a*) to 1(*c*). In addition, the disposition of the male screw 412 and the female screw 414 may be replaced such that the above-described disposition is reversed (namely, a female screw and a female screw are disposed at the counter grip portion—side end portion of the arm 10 and at the end portion of the assist arm 400, respectively).

(2)

Figure 8A:
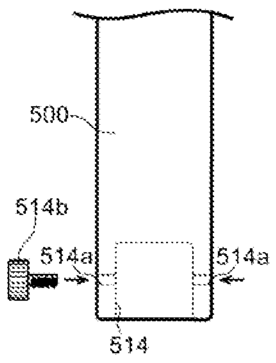
FIGS. 8(*a*) to 8(*c*) illustrate views illustrating another example of a joint structure between an arm and an assist arm, and FIGS. 8(*a*) to 8(*c*) are a top view, a front view, and a side view of a joint portion of the assist arm, respectively.
Figure 8B:
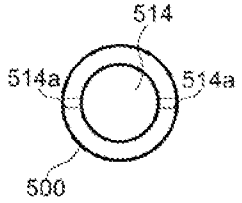
Figure 8C:
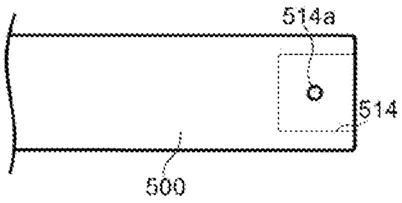

A joint structure between the arm and the assist arm is not limited to the above-described screwing between the male screw (or the female screw) provided in the arm and the female screw (or the male screw) provided in the assist arm. For example, as illustrated in FIGS. 8(*a*) to 8(*c*), a structure may be adopted in which a mortise portion 514 and a screw hole 514*a* penetrating through a side wall portion of the mortise portion 514 in the radial direction are formed at an end portion of an assist arm 500, a tenon portion corresponding to the mortise portion 514 is formed at the counter grip portion—side end portion of the arm (not illustrated), and the tenon portion is inserted into the mortise portion 514 and a screw 514*b* is screwed into the screw hole 514*a* from the outside to join the assist arm 500 to the arm.

(3)

Figure 9:
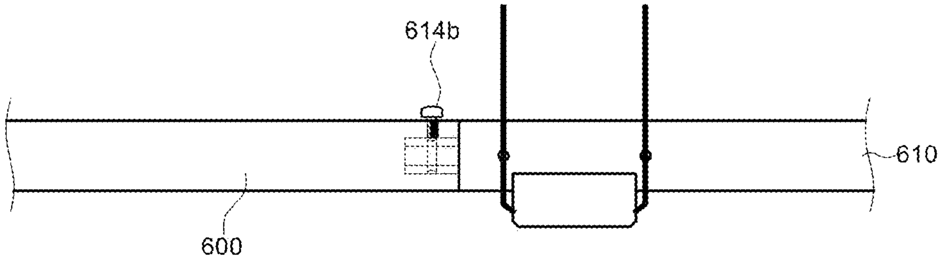
FIG. 9 is a side view illustrating another example of a joint structure between an arm and an assist arm.
Figure 10:
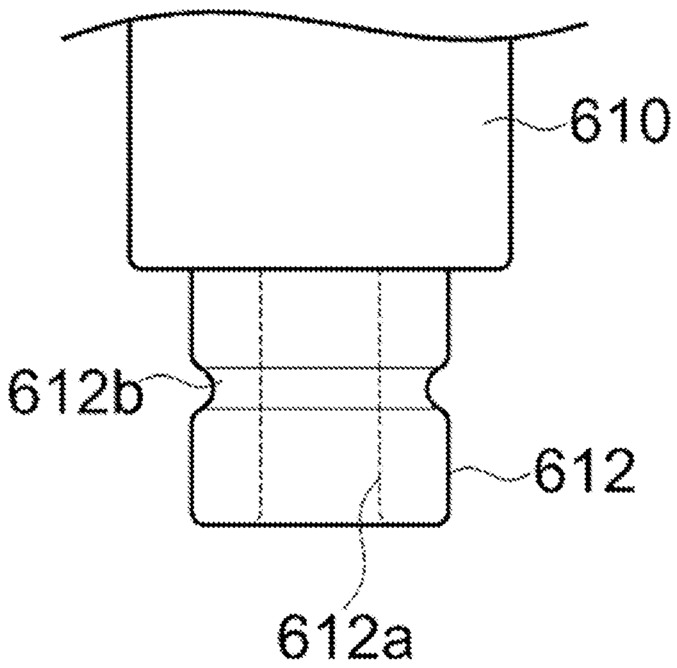
FIG. 10 is a top view of a joint portion of the arm illustrated in FIG. 9.
Figure 11:
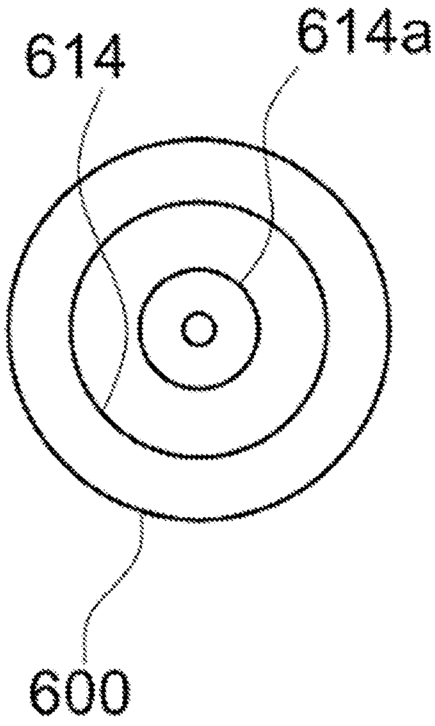
FIG. 11 is a front view of a joint portion of the assist arm illustrated in FIG. 9.

Further, for example, as illustrated in FIGS. 9 to 11, a structure may be adopted in which in addition to a tenon portion and a mortise portion, a secondary mortise portion and a secondary tenon portion are formed. In a joint structure illustrated in the same drawings, a tenon portion 612 is formed at a counter grip portion—side end portion of an arm 610, and a mortise portion 614 is formed at an end portion of an assist arm 600.

As illustrated in FIG. 10, the tenon portion 612 has a diameter that is one size smaller than a diameter of the arm 610, and extends in a circular column shape from the counter grip portion—side end of the arm 610 in the axial direction. A secondary mortise portion 612*a* is formed inside the tenon portion 612, the secondary mortise portion 612*a* having an inner diameter that is one size much smaller than that diameter of the tenon portion 612, and extending in a circular hole shape over a substantially total length of the tenon portion 612 in the axial direction. In addition, a groove portion 612*b* recessed from a surface of the tenon portion 612 to have an arc cross-sectional shape is formed at the position of a substantially center of the tenon portion 612 in the axial direction to extend along a circumferential direction.

As illustrated in FIG. 11, the mortise portion 614 is formed at the end portion of the assist arm 600 to have an inner diameter and a depth corresponding to the tenon portion 612 and to be recessed in a circular hole shape, and similarly to the above-described modification example illustrated in FIGS. 8(*a*) to 8(*c*), a screw hole (not illustrated) penetrating through a side wall portion of the mortise portion 614 in the radial direction is formed. In addition, a secondary tenon portion 614*a* having a diameter and a length corresponding to the secondary mortise portion 612*a* and extending in a circular column shape in the axial direction is formed on a central portion of an inmost surface of the mortise portion 614.

The assist arm 600 can be joined to the arm 610 by inserting the tenon portion 612 into the mortise portion 614 and by screwing a screw 614*b* into the screw hole from the outside as illustrated in FIG. 9. According to this joint structure, the secondary mortise portion 612*a* and the secondary tenon portion 614*a* enable more reliable and stable joining.

(4)

Figure 12:
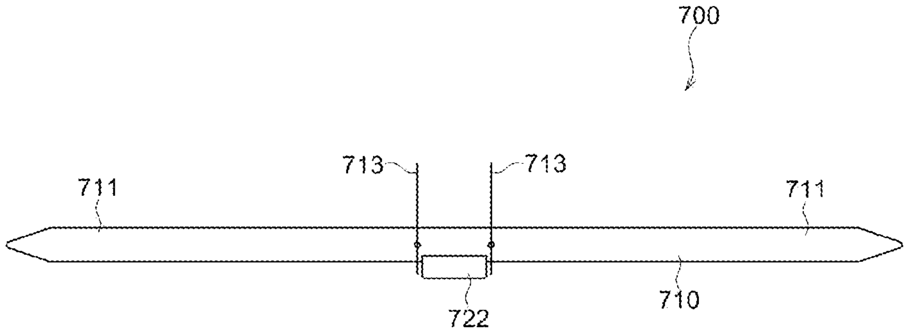
FIG. 12 is a side view of another modification example of the medicine applicator according to the invention.

Further, for example, as schematically illustrated in FIG. 12, a configuration may be adopted in which a pedestal portion 722 is disposed on a substantially central portion of an arm 710 and both end portions of the arm 710 are used for gripping. Similarly to the medicine applicator 100 according to the embodiment illustrated in FIG. 1, a medicine applicator 700 illustrated in the same drawing includes the arm 710 having a rod shape and extending long; the pedestal portion 722 disposed on the arm 710; and pressing tools 713 and 713, but whereas the arm 10 according to the embodiment illustrated in FIGS. 1(*a*) to 1(*c*) has a length of approximately 30 to 70 cm (or approximately 40 to 60 cm), the arm 710 according to the present modification example has a total length of approximately 60 to 140 cm (or approximately 40 to 110 cm) that is longer by a length of approximately 30 to 70 cm (or approximately 10 to 50 cm) of the assist arm. In other words, the arm 710 according to the present modification example has a non-divided configuration having, for example, a total length of approximately 60 to 140 cm that is substantially equivalent to a length obtained by adding, for example, a length of approximately 30 to 70 cm of the assist arm 400 according to the modification example illustrated in FIG. 7 to, for example, a length of approximately 30 to 70 cm of the arm 10 according to the embodiment illustrated in FIGS. 1(*a*) to 1(*c*), namely, a configuration in which the arm and the assist arm are not divided and integrally formed from the beginning.

Then, the configuration is such that the pedestal portion 722 is disposed on the substantially central portion of the arm 710 according to the present modification example and both the end portions of the arm 710 are used for gripping as grip portions 711 and 711.

In the medicine applicator 700 according to the present modification example, a user can grip the grip portions 711 and 711 formed at both the end portions, and move an applicator body on the skin in a dry fabric rubbing manner. Accordingly, similarly to the case of the medicine applicator 102 according to the modification example illustrated in FIG. 7, the operability of the applicator body is improved.

Incidentally, a configuration of a pressing mechanism (repulsive tool and the like) of FIGS. 7, 9, and 12 that are modification examples conforms to that of FIGS. 1(*a*) to 6(*b*).

(5)

Figure 13A:
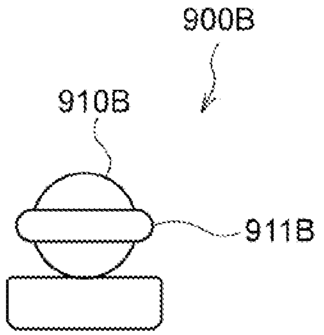
FIGS. 13(*a*) and 13(*b*) illustrate views for describing further another modification example of the medicine applicator according to the invention, and FIGS. 13(*a*) and 13(*b*) are a rear view and a side view of a grip portion, respectively.
Figure 13B:
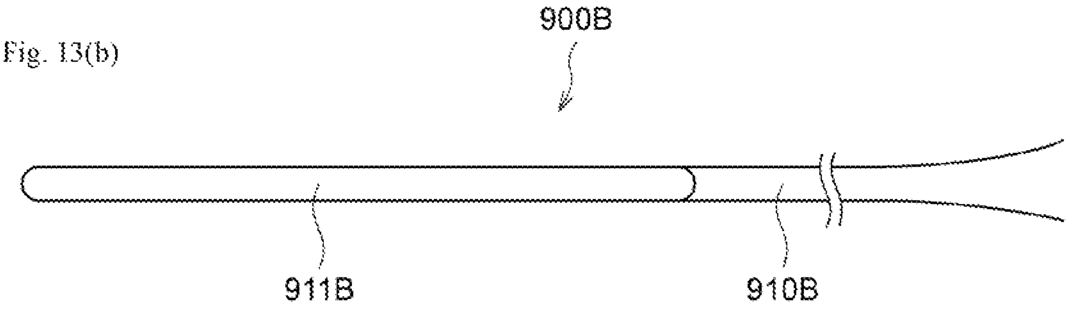
Figure 14A:
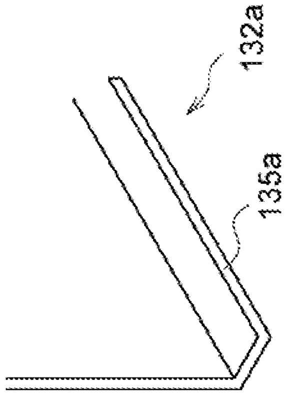
FIGS. 14(*a*) to 14(*f*) are perspective views of several modification examples of a contact portion of the pressing tool according to the invention.
Figure 14B:
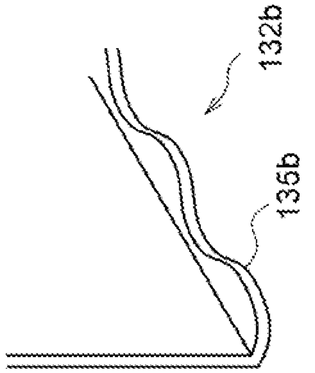
Figure 14C:
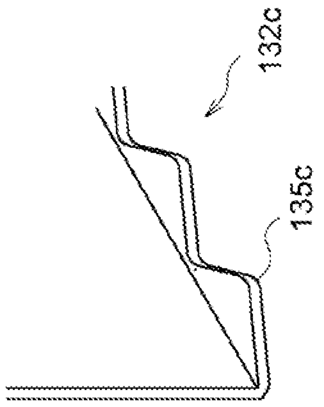
Figure 14D:
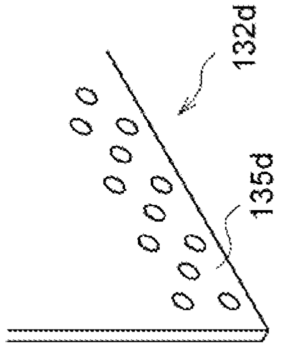
Figure 14E:
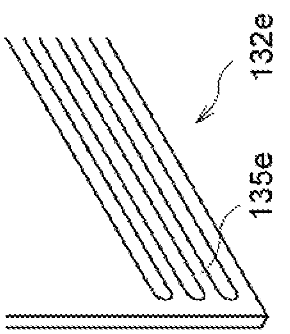
Figure 14F:
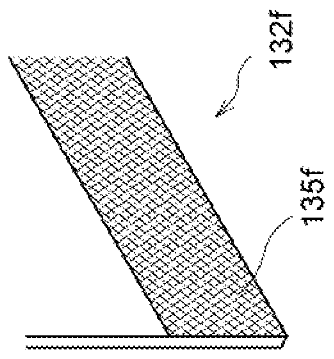

Next, FIGS. 13(*a*) and 13(*b*) illustrate a further modification example of the medicine applicator 100 according to the invention. A medicine applicator 900B according to the present modification example is configured such that a grip portion having a shape different from that of other portions of an arm is provided on at least one end portion side of the arm.

The grip portion may be, for example, a grip portion having substantially the same configuration as that of other portions of the arm similarly to the grip portion 11 of the medicine applicator 100 according to the embodiment illustrated in FIGS. 1(*a*) to 1(*c*), but may be a grip portion having a configuration different from that of other portions of the arm as in the medicine applicator 900B according to the present modification example, so that the ease to grip, the handleability, or the like can be further improved.

In the medicine applicator 900B according to the modification example illustrated in FIGS. 13(*a*) and 13(*b*), one end portion side of an arm 910B having a round rod shape with a circular cross section is formed in a flat plate shape by being crushed from both sides in the radial direction (both upper and lower sides in FIGS. 13(*a*) and 13(*b*)) to the center, to form a grip portion 911B. Both end edge portions of the grip portion 911B are formed with an arc-shaped cross section (substantially semi-circular shape).

According to the grip portion 911B described above, since a grip position is unlikely to be offset in the circumferential direction when the grip portion 911B is gripped with a hand, more reliable gripping is possible, and particularly, even when the person to be applied performs an operation on the back that he or she cannot see, a posture of the medicine applicator 900B around an axis (angular position) can be easily and reliably identified, and the medicine applicator 900B is easily controlled and held at a desired angular position.

Furthermore, in addition to the grip portion 911B described above, for example, a non-slip portion may be provided on at least one end portion side of the arm by forming a layer made of rubber or the like on a surface portion or by forming protrusions and recesses in a surface, to form the grip portion. Namely, the grip portion may be different in shape and/or material from other portions of the arm. In addition, various grip portions provided as exemplary examples above can also be provided on the other end portion side of the arm or in the assist arm.

(6)

The contact portion of the pressing tool can adopt various configurations. For example, as illustrated in FIGS. 14(*a*) to 14(*f*), contact portions each including a non-slip portion including a protruding portion and/or a recessed portion are exemplary examples.

Each of contact portions 132*a* to 132*c* illustrated in FIGS. 14(*a*) to 14(*c*), similarly to the contact portion 132 according to the embodiment illustrated in FIGS. 1(*a*) to 1(*c*), is formed by bending a tip portion in the direction of the pedestal portion, and each of contact portions 132*d* to 132*f* illustrated in FIGS. 14(*d*) to 14(*f*), is directly formed on a pedestal portion—side surface of a tip portion without the tip portion being bent. Accordingly, a portion that can come into contact with the application member is provided with various non-slip portions.

The contact portions 132*a* to 132*c* illustrated in FIGS. 14(*a*) to 14(*c*) are formed in a shape in which the tip portions of the respective pressing tools are bent inward (pedestal portion side), to form respective projections 135*a* to 135*c* as protruding portions. More specifically, the projection 135*a* illustrated in FIG. 14(*a*) is shaped such that a tip edge is linear, the projection 135*b* illustrated in FIG. 11(*b*) is shaped such that a tip edge extends upward and downward in a wave shape, and the projection 135*c* illustrated in FIG. 14(*c*) is shaped such that a tip edge extends upward and downward in a mountain-and-valley shape.

Each of the contact portions 132*d* to 132*f* illustrated in FIG. 14(*d*) to 14(*f*) is configured such that a protruding portion and/or a recessed portion are formed on the pedestal portion—side surface of the tip portion. More specifically, the contact portion 132*d* illustrated in FIG. 14(*d*) is subjected to embossing to form a protrusion and recess surface portion 135*d* including a large number of protrusions and recesses. The contact portion 132*e* illustrated in FIG. 14(*e*) is provided with a plurality of slits disposed along the width direction of the pressing tool, to form a protrusion and recess surface portion 135*e*. Incidentally, instead of the slits or in combination with the slits, a projection protruding from the pedestal portion—side surface of the tip portion may be provided. The contact portion 132*f* illustrated in FIG. 14(*f*) forms a protrusion and recess surface portion 135*f* having a shape that is processed to form protrusions and recesses in a grid pattern.

Further, in addition to the foregoing modes, for example, it is also possible to adopt a mode in which the pedestal portion—side surface of the tip portion is subjected to a surface treatment to have a sand shape (by application, etching, or the like), or a mode in which the pedestal portion—side surface of the tip portion is not subjected to a treatment.

(7)

As the arm, in addition to an arm having a round rod shape similar to the arm 10 according to the embodiment, for example, anus having various shapes such as an arm having a prismatic shape, an arm having a substantially T shape in a cross-sectional view, and an arm having a substantially H shape in a cross-sectional view can be used. In addition, the arm may be solid or hollow (pipe shape). Furthermore, the arm may have a mode in which the arm is expandable and contractable by a nested structure or the like, or a mode in which a centralization portion side and a grip portion side of the arm can be separated by a nested structure or the like.

According to the embodiment and each modification example of the invention described above, the person to be applied can evenly apply an antiphlogistic agent, a medicine, or a cosmetic such as a sunblock to the back that he or she cannot see.

(8)

Figure 15:
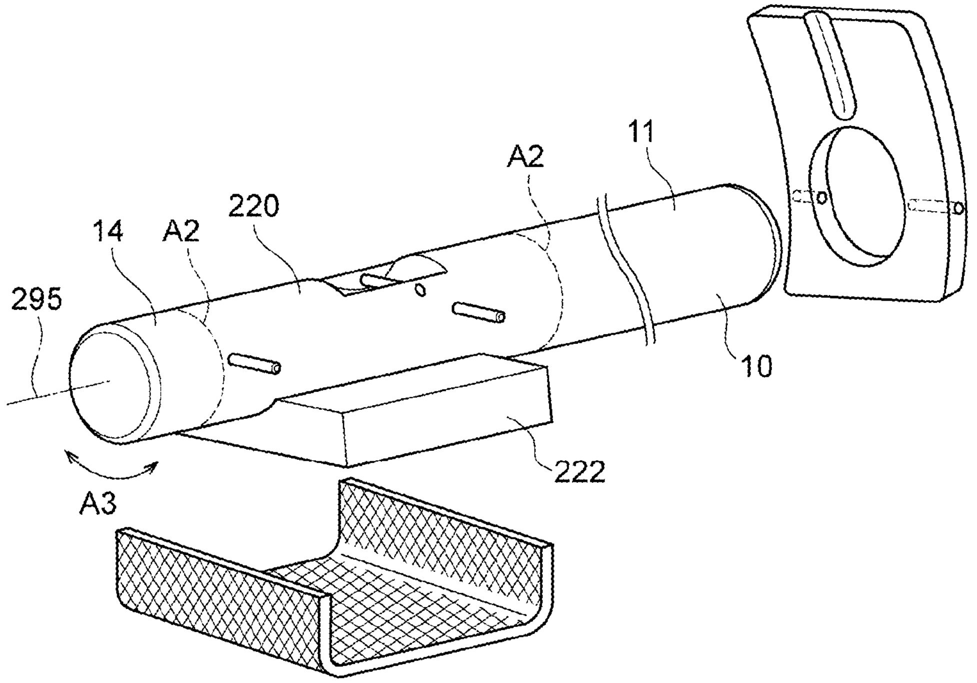
FIG. 15 is an exploded perspective view of another modification example of the medicine applicator according to the invention.
Figure 16A:
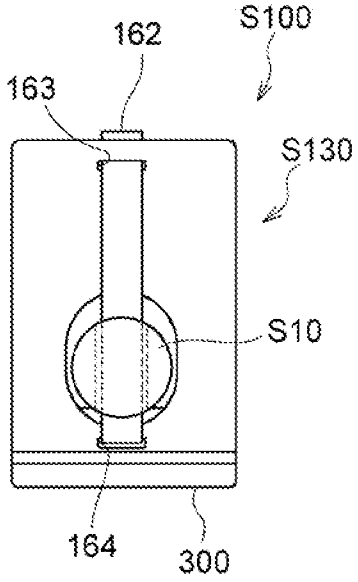
FIGS. 16(*a*) and 16(*b*) are a front view and a side view of main parts of a modification example of the medicine applicator according to the invention, respectively, and FIGS. 16(*c*) and 16(*d*) are a side view and a front view of a pressing tool, respectively.
Figure 16B:
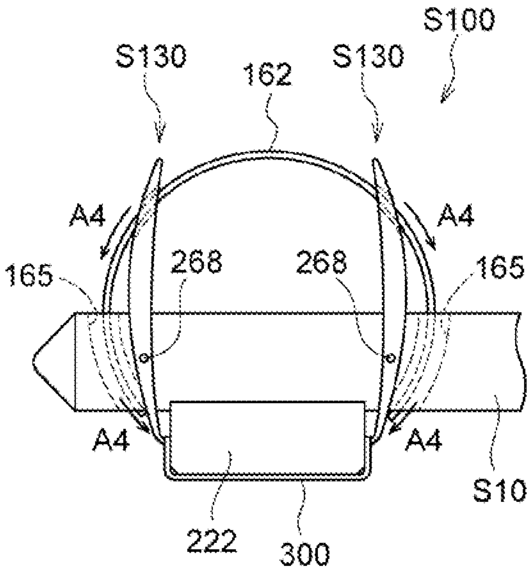
Figure 16C:
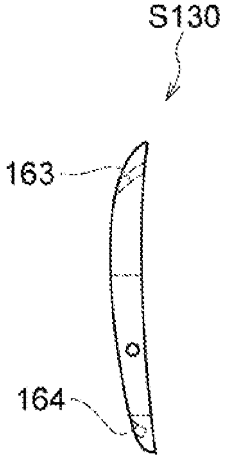
Figure 16D:
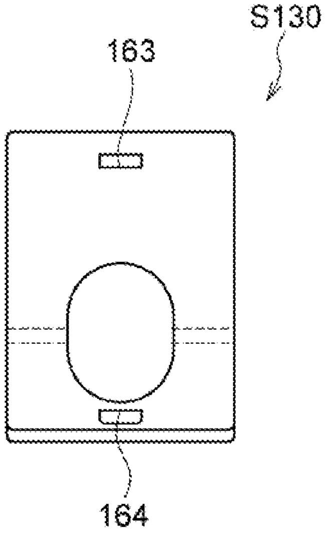
Figure 17A:
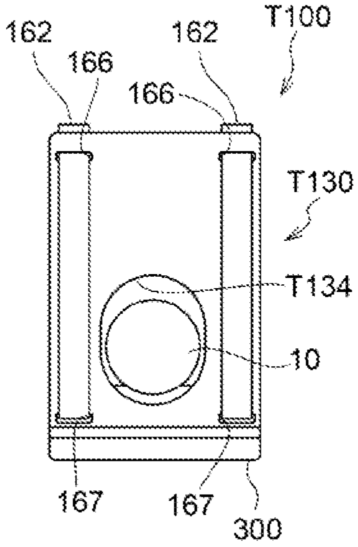
FIGS. 17(*a*) and 17(*b*) are a front view and a side view of main parts of another modification example of the medicine applicator according to the invention, respectively, and FIGS. 17(*c*) and 17(*d*) are a side view and a front view of a pressing tool, respectively.
Figure 17B:
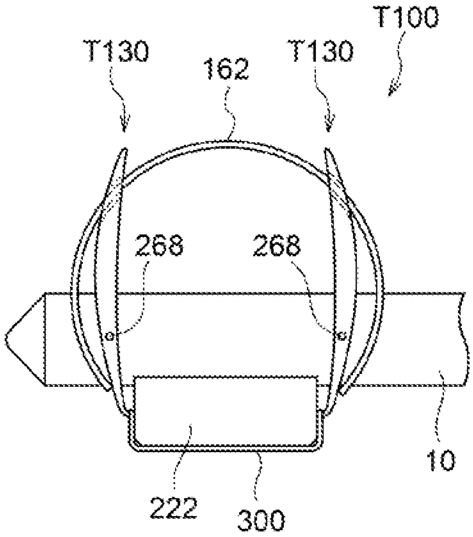
Figure 17C:
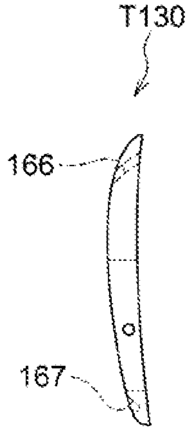
Figure 17D:
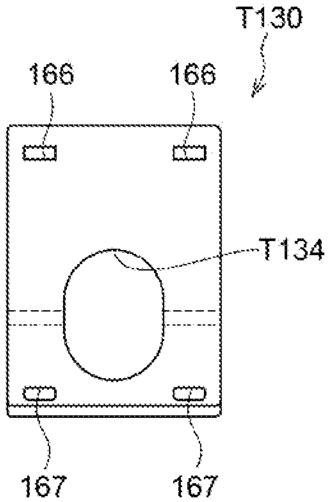

In addition, in the embodiment and each modification example, a body portion of the centralization portion 220 and the arm 10 on a grip portion side are integrally disposed as described above, but far example, as illustrated in FIG. 15, the body portion of the centralization portion 220 and the arm 10 on a grip portion 11 side and on an extending portion 14 side are cut from each other along cutting planes parallel to the radial direction as illustrated by broken line A2, and both are coupled to each other in the axial direction to be rotatable around a coupling axis 295. Incidentally, the arm 10 on the extending portion 14 side may remain integrated with the body portion of the centralization portion 220 without being cutting therefrom. Namely, the configuration may be such that at least the body portion of the centralization portion 220 and the arm 10 on the grip portion 11 side are cut from each other. Since the centralization portion 220 and the arm 10 on the grip portion side are configured to be rotatable (or swingable) in such a manner, as illustrated by arrow A3, the pedestal portion 222 is two-dimensionally rotatable in a left-right direction (in a swinging manner) with respect to the grip portion 11, and the application member 300 can be smoothly brought into close contact with a curved surface of the skin of the person to be applied.

(9)

Next, FIGS. 16(*a*) to 16(*d*) illustrate a further modification example of the medicine applicator according to the invention. A medicine applicator S100 illustrated in the same drawing is provided with a penetrated portion as a regulating portion that can regulate a repulsive tool so as to pass through the penetrated portion within a predetermined range.

In the present modification example, as illustrated in FIGS. 16(*a*) and 16(*b*), a repulsive tool 162 is configured by forming a leaf spring (or a wire spring or the like) to be curved in a partially circular shape (substantially C shape) in which a part is missing. In addition, a configuration of an arm S10 is the same as the configuration of the arm 10 according to the embodiment illustrated in FIGS. 1(*a*) to 1(*c*), except that clearance holes 165 and 165 are provided outside the attachment positions of a pair of pressing tools S130 and S130 (on sides opposite the pedestal portion 222 side), respectively. On the other hand, as illustrated in FIGS. 16(*c*) and 16(*d*), each of the pressing tools S130 has the same configuration as that of the pressing tool 130 according to the embodiment illustrated in FIGS. 1(*a*) to 1(*c*), except that the guide rail is not provided and a passage hole 163 and a holding hole 164 are provided at substantially central portions in a width direction of an upper end edge-vicinity portion and a lower end edge-vicinity portion, respectively. The passage hole 163 has a substantially oblong cross-sectional shape that is laterally long and that is larger than the cross section of the repulsive tool 162, and as illustrated in FIG. 16(*c*), penetrates through the pressing tool S130 from a back surface (pedestal portion 222—side surface) to a front surface while being inclined downward, to form a curved shape corresponding to the shape of the repulsive tool 162. The holding hole 164 has the same cross-sectional shape as that of the passage hole 163, and as illustrated in FIG. 16(*c*), is recessed from the front surface of the pressing tool S130 to the vicinity of a central portion in a thickness direction while being inclined downward, to form a curved shape corresponding to the shape of the repulsive tool 162 (namely, the holding hole 164 is formed to open only on a front surface side of the pressing tool S130 and to come to a dead end inside the pressing tool S130 without penetrating to a back surface side). As illustrated in FIGS. 16(*a*) and 16(*b*), the clearance holes 165 each have a substantially oblong cross-sectional shape that is laterally long and that is larger than the cross section of the repulsive tool 162, and penetrate through the arm S10 from positions that are slightly closer to both outer sides in a length direction of the arm S10 than the pedestal portion 222, to an opposite side (upper side in FIGS. 16(*a*) to 16(*d*)) on a pedestal portion 222—formation side of a peripheral surface of the arm S10 (lower side in FIGS. 16(*a*) to 16(*d*)) while extending to both the outer sides in the length direction, to form a curved shape corresponding to the shape of the repulsive tool 162.

As illustrated in FIGS. 16(*a*) and 16(*b*), similarly to the case of the embodiment illustrated in FIGS. 1(*a*) to 1(*c*), the pair of pressing tools S130 and S130 are attached to the arm S10, and the repulsive tool 162 is disposed to pass through the passage holes 163 and 163 of both the pressing tools S130 and S130 and through the clearance holes 165 and 165 of the arm S10 and to be fitted into the holding holes 164 and 164 of both the pressing tools S130 and S130 at both ends of the repulsive tool 162. In a disposed state, as illustrated by arrow A4 in FIG. 16(*b*), an elastic force acts toward both the ends along a circumferential direction of the repulsive tool 162, and accordingly, both the pressing tools S130 and S130 can press and hold the application member 300 on the pedestal portion 222 through contact portions. On the other hand, when the pair of pressing tools S130 and S130 are pinched with knob portions to approach each other against the elastic force of the repulsive tool 162, the contact portions of both the pressing tools S130 and S130 can be separated from the application member 300, and the application member 300 can be released, but since the repulsive tool 16 moves to extend outward with this release operation, the passage holes 163, the holding holes 164, and the clearance holes 165 each are formed with a margin not to interfere with the movement of the repulsive tool 16.

According to the present modification example, since the operation of the repulsive tool 162 is regulated by the passage holes 163, the holding holes 164, and the clearance holes 165, similarly to the case of the embodiment illustrated in FIGS. 1(*a*) to 1(*c*), the operation of the repulsive tool 162 is reliably and easily performed, and accordingly, a pressing force of the repulsive tool 162 is reliably and sufficiently transmitted to the pressing tools S130 and S130, and even when the repulsive tool is subjected to a force in the radial direction or sometimes in the axial direction, the repulsive tool is not removed from the applicator body, and the function of the medicine applicator is not impaired. Incidentally, similarly to the guide rails 160 and the like according to the embodiment illustrated in FIGS. 1(*a*) to 1(*c*), the passage holes 163, the holding holes 164, and the clearance holes 165 according to the present modification example can function as both a regulating portion and a guide portion.

(10)

Further, a modification example illustrated in FIGS. 17(*a*) to 17(*d*) may be implemented. A medicine applicator T100 illustrated in the same drawing has the same configuration as that of the medicine applicator S100 according to Modification Example (9), except that a plurality of the repulsive tools 162 made of leaf springs (or wire springs or the like) are provided. A pressing tool T130 according to the present modification example has the same configuration as that of the pressing tool S130 according to Modification Example (9), except that passage holes 166 and 166 and holding holes 167 and 167 are provided in the vicinities of both end portions in a width direction of an upper end edge-vicinity portion and a lower end edge-vicinity portion, respectively, to be slightly separated from a through-hole T134 to both sides in the width direction. Then, similarly to the repulsive tools 162 according to Modification Example (9), two repulsive tools 162 and 162 are disposed using the passage holes 166 and 166 and the holding holes 167 and 167.

According to the present modification example, since the plurality of repulsive tools 162 are provided, elastic forces of the repulsive tools 162 can act more effectively, and an operation of the repulsive tools 162 can be more stabilized. Further, since the repulsive tools 162 are disposed to avoid the position of the through-hole T134, the repulsive tools 162 do not interfere with the arm 10, and therefore, the need for providing a clearance hole in the arm 10 can be eliminated.

Incidentally, a plurality of the repulsive tools may be provided which include the repulsive tools passing through the respective clearance holes 165 and 165 of the arm S10 as in the repulsive tools 162 according to Modification Example (9), and regardless of a disposition mode, three or more repulsive tools may be provided.

(11)

Figure 18A:
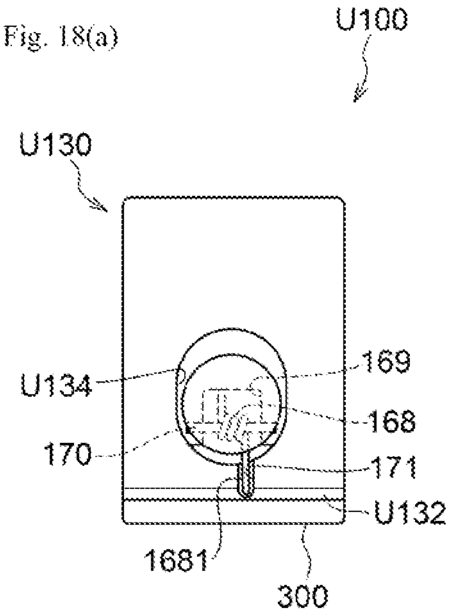
FIGS. 18(*a*) to 18(*c*) are a front view, a side view, and a bottom view of main parts of further another modification example of the medicine applicator according to the invention, respectively.
Figure 18B:
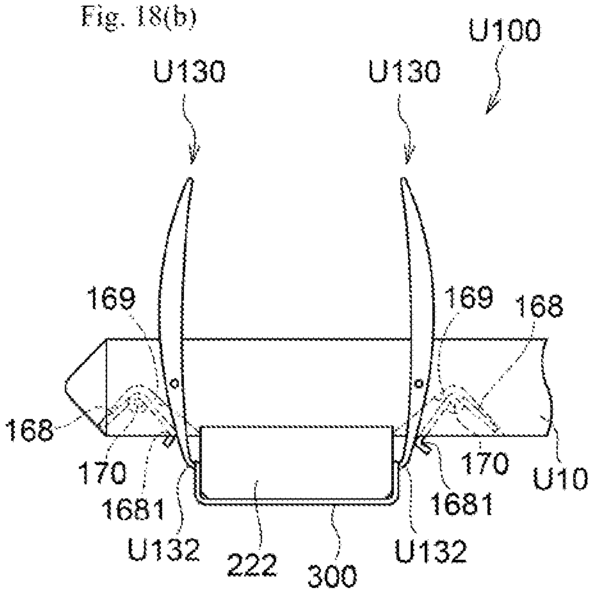
Figure 18C:
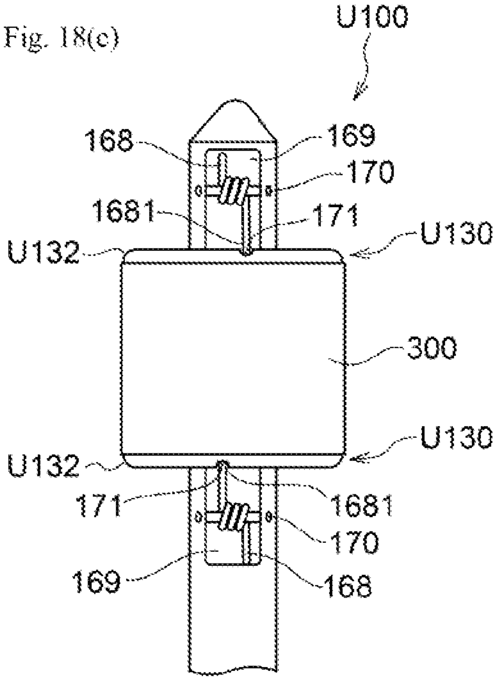

FIGS. 18(*a*) to 18(*c*) illustrate a further modification example of the medicine applicator according to the invention. A medicine applicator U100 illustrated in the same drawing is such that a repulsive tool 168 is provided on the pedestal portion 222 side of a peripheral surface of an arm U10.

In the present modification example, on the pedestal portion 222 side (lower side in FIGS. 18(*a*) and 18(*b*)) of the peripheral surface of the arm U10, recessed grooves 169 and 169 each being recessed in a shape that is tapered in a substantially triangular shape in a cross-sectional view are provided at respective positions adjacent to the outsides in a length direction with respect to the pedestal portion 222, and repulsive tool holding shafts 170 and 170 are provided across inmost portions inside the respective recessed grooves 169 and 169 along a width direction of pressing tools U130. The repulsive tool 168 is made of a kick spring, a bent portion 1681 is formed at one end portion thereof, and a coil portion thereof is wound around the repulsive tool holding shaft 170. The pressing tool U130 has the same configuration as that of the pressing tool 130 according to the embodiment illustrated in FIGS. 1(*a*) to 1(*c*), except that a guide rail 171 is formed in a front surface (surface opposite a pedestal portion 222—side surface), the guide rail 171 extending linearly from a position that is slightly offset to one in the width direction from a center of a contact portion U132—side end edge portion (lower end edge portion in FIGS. 18(*a*) and 18(*b*)) of a through-hole U134 toward a lower end edge of the pressing tool 130. Namely, the guide rail 171 is provided in a surface of the pressing tool U130 opposite a direction in which the contact portion U132 is bent, to extend linearly from a position that is slightly offset to one from a center of a short side forming a contact portion U132—side end of the pressing tool U130, along a length direction (up-down direction in FIGS. 14(*a*) and 14(*b*)) of the pressing tool U130 until the guide rail 171 communicates with the through-hole U134.

In the present modification example, the bent portion 1681 of the repulsive tool (kick spring) 168 is fitted into the guide rail 171 and presses the contact portion U132—side end portion in the front surface of the pressing tool U130 while sliding in the guide rail 171, and on the other hand, an end portion of the repulsive tool (kick spring) 168 opposite a bent portion 1681—formation side comes into contact with one inclined surface in the recessed groove 169 and is stopped. With this configuration, an elastic force of the repulsive tool (kick spring) 168 can act on the pressing tool U130.

Incidentally, for example, the repulsive tool 168 made of a kick spring according to the present modification example may be changed to a repulsive tool made of a leaf spring, or the like.

(12)

Figure 19A:
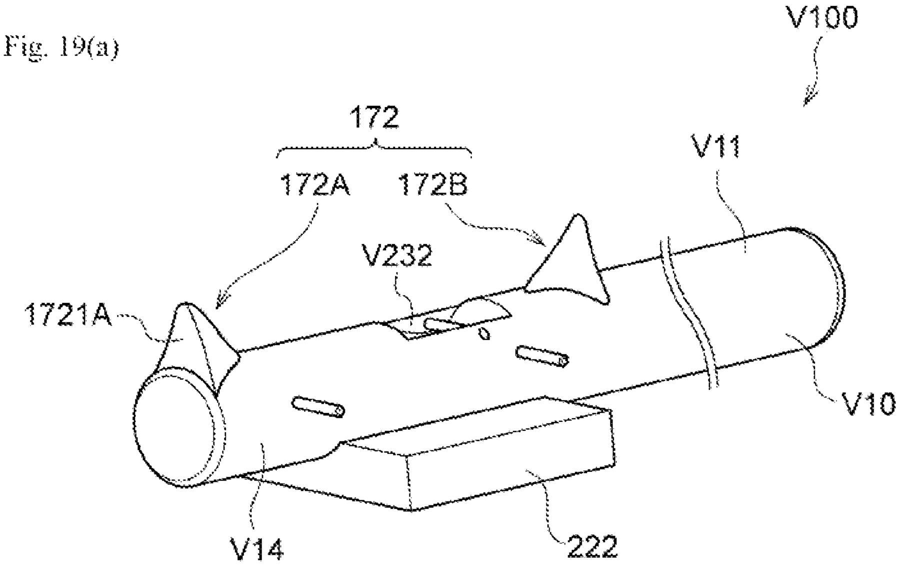
FIGS. 19(*a*) to 19(*c*) are a perspective view, a top view, and a side view of main parts of further another modification example of the medicine applicator according to the invention, respectively.
Figure 19B:
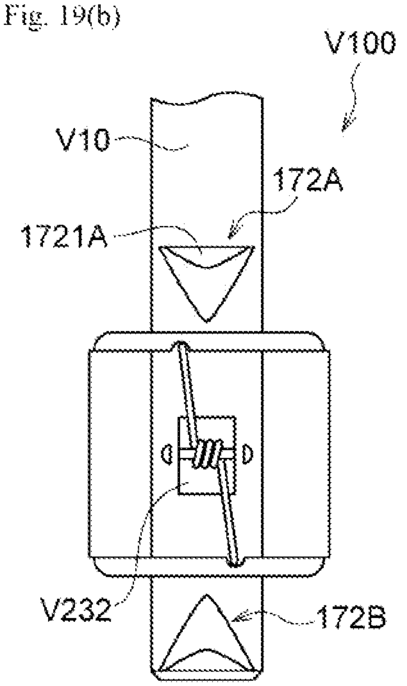
Figure 19C:
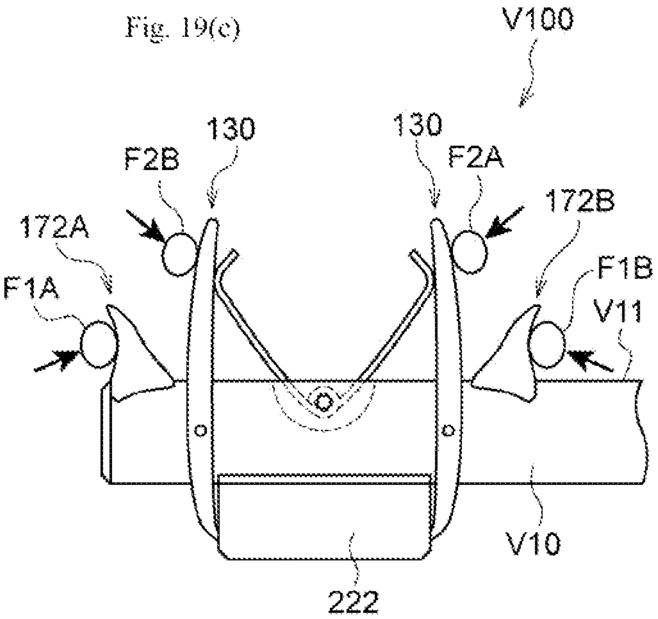

FIGS. 19(*a*) to 19(*c*) illustrate a further modification example of the medicine applicator according to the invention. A medicine applicator V100 illustrated in the same drawing is provided with a finger contact portion 172 in addition to having the same configuration of the medicine applicator 100 according to the embodiment illustrated in FIGS. 1(*a*) to 1(*c*).

In the present modification example, finger contact portions 172A and 172B are provided on a peripheral surface of an arm V10 at respective positions that are slightly spaced from a groove V232 to both outer sides in a length direction (may span to the through-hole of the pressing tool 130, but is spaced not to interfere with the operation of the pressing tool 130). Of the finger contact portions 172, a finger contact surface 1721A extending outward from a surface opposite a pedestal portion 222 side (upper side in FIG. 19(*a*)) on the peripheral surface of the arm V10 to form a mountain shape of which a tip is rounded in a front view is formed in the finger contact portion 172A on an extending portion V14 side, both side surfaces extend in a slope shape from both hypotenuses of the finger contact surface 1721A to converge at one point portion that is slightly spaced toward the groove 232 on the peripheral surface of the arm V10, and the finger contact portion 172A is formed in a three-dimensional shape as a whole that protrudes in a substantially triangular pyramid shape from the peripheral surface of the arm V10. A ridge line portion (intersecting line portion between both the side surfaces) extending from a top of the finger contact portion 172A toward the groove V232 while being inclined downward extends while maintaining a cross-sectional shape that is continuous from tips of the finger contact surface 1721A and that is rounded, and a tip portion at which the ridge line portion intersects the peripheral surface of the arm V10 is also formed to be rounded in a plan view. In addition, as illustrated in FIG. 19(*c*), the finger contact surface 1721A is formed to be round recessed in a substantially arc shape from the peripheral surface of the arm V10 outward and slightly inward as a whole in a side view.

In the present modification example, as illustrated in FIG. 19(*c*), the pressing tool 130 on a grip portion V11 side can be opened and closed by placing one finger (for example, thumb) F1A on the finger contact surface 1721A of the finger contact portion 172A on the extending portion V14 side and placing another finger (for example, index finger) F2A on a front surface side of the knob portion of the pressing tool 130 on the grip portion V11 side, and by performing pinching with the fingers F1A and F2A. On the other hand, the pressing tool 130 on the extending portion V14 side can be opened and closed by placing one finger (for example, index finger) F1B on a finger contact surface of the finger contact portion 172B on the grip portion V11 side and placing another finger (for example, thumb) F2B on a front surface side of the knob portion of the pressing tool 130 on the extending portion V14 side, and by performing pinching with the fingers F1B and F2B. Since the finger contact portions 172 are provided in such a manner, an individual opening and closing operation of one pressing tool 130 of the pair of pressing tools 130 and 130 is also facilitated, so that the operability is improved.

The finger contact portions 172A and 172B may be individually formed and integrated by being joined to the peripheral surface of the arm V10, or may be integrally formed with the arm V10 at the same time. In addition, the shape of the finger contact portion can be any shape such as a box shape, a columnar shape, a flake shape, and a knob shape, and for example, at least a part of the finger contact portion may be configured to be expandable and contractable, or a sliding structure may be adopted in which the finger contact portion is slidable in a longitudinal direction of the arm V11 to adjust a width between individual fingers.

In addition, needless to say, the finger contact portion can also be applied to, for example, a medicine applicator according to another mode such as a mode in which grip portions are provided at both end portions of an arm.

(13)

Figure 20A:
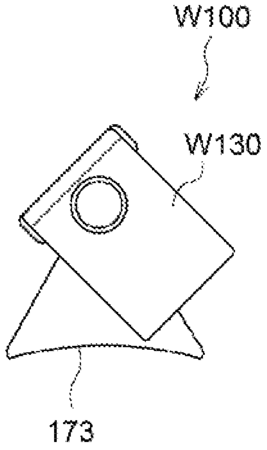
FIGS. 20(*a*) to 20(*c*) are a front view, a side view, and a bottom view of further another modification example of the medicine applicator according to the invention, respectively.
Figure 20B:
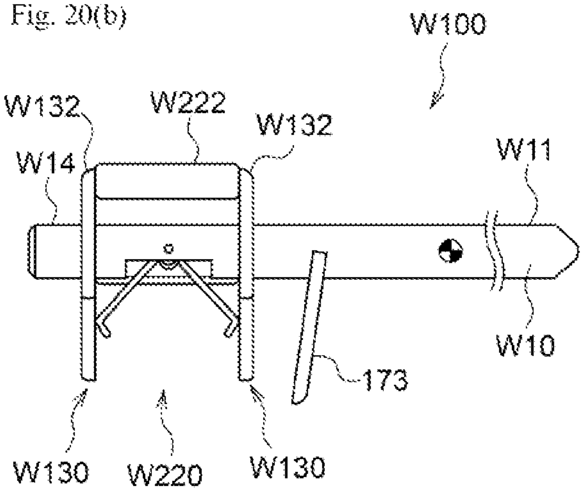
Figure 20C:
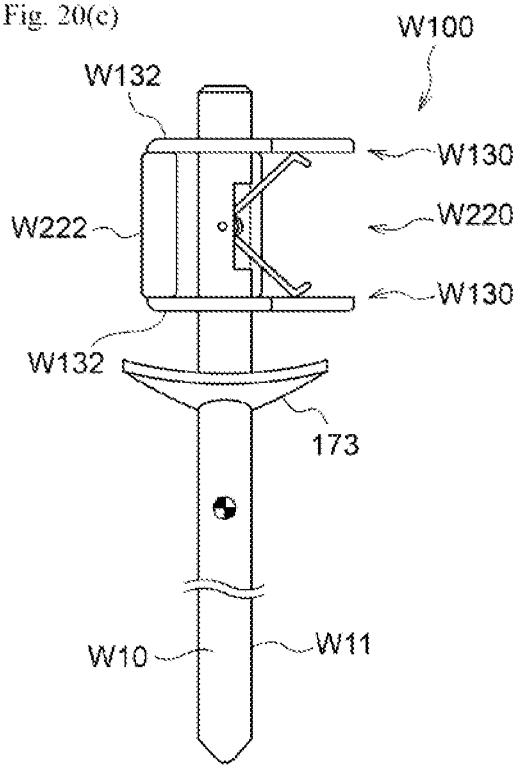

FIGS. 20(*a*) to 20(*c*) illustrate a further modification example of the medicine applicator according to the invention. A medicine applicator W100 illustrated in the same drawing is such that an arm W10 is provided with an assist foot 173 for operating pressing tools W130.

In the present modification example, the assist foot 173 is provided at a position that is slightly offset to a grip portion W11 side from a centralization portion W220 in the arm W10. The assist foot 173 has a plate shape that gradually extends outward from a peripheral surface of the arm W10 in a radial direction to form a substantially triangular shape in a front view, and corners of both tips are formed in a round chamfered shape. In addition, as illustrated in FIG. 20(*c*), the assist foot 173 has a shape that is curved from both end portions to a central portion to bulge slightly to the grip portion W11 side in a substantially arc shape in a bottom view.

The assist foot 173 is integrated with the peripheral surface of the arm W10, and this integration may be integration by joining the assist foot 173 to the arm W10 or by integrally forming both at the same time, but in order to improve the stability or to prevent the assist foot from being lost, it is desirable that the assist foot is configured to be non-detachably fixed to the arm W10.

Figure 21:
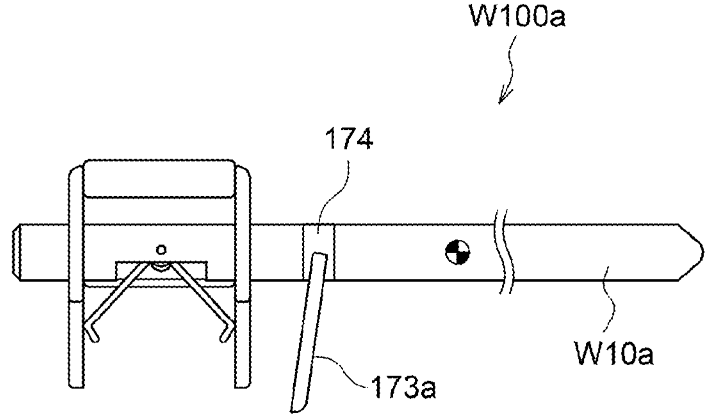
FIG. 21 is a side view of further another modification example of the medicine applicator according to the invention.

However, for example, as illustrated in FIG. 21, an arm W10*a* may be provided with an attachable and detachable portion 174 from which an assist foot 173*a* is attachable to and detachable. The attachable and detachable portion 174 illustrated in the same drawing is configured by bonding or embedding a magnetic body to at least a surface of the arm W10*a* or inside an arm portion, and on the other hand, similarly, at least a corresponding location of the assist foot 173*a* (portion that is in contact with the peripheral surface of the arm W10*a*) is also made of a magnetic body, and accordingly, the assist foot 173*a* is freely attachable to and detachable from the arm W10*a*. Further, for example, the arm and the assist foot may be configured to be detachably coupled to each other through a hole and a shaft in a physical structure without using a magnetic body.

In such a case, when a user uses the medicine applicator, the assist foot 173*a* is removable, and application can be performed without the assist foot interfering with a clothing worn by the user.

The medicine applicator W100 (and W100*a*) according to the present modification example can be placed on a flat surface such as a floor surface while being supported by tip edges of the assist foot 173, but at this time, the center of gravity of the medicine applicator W100 is located at a position that is slightly offset to the grip portion W11 side from the assist foot 173, and for this reason, the medicine applicator W100 takes an inclined posture in which with a tip of the assist foot 173 as a fulcrum, a grip portion W11—side end descends to come into contact with the flat surface while the centralization portion W220 floats up. Therefore, in this inclined posture, tips of the pressing tools W130 are held to be always separated from the flat surface. Since it is possible to attach and detach the application member while operating the pressing tools W130 without interference with the flat surface, the application member can be easily attached and detached. Since the applicator body is separated from the flat surface and does not interfere therewith, the arm W10 and the assist foot 173 can be set at any angle in the radial direction of the arm W10.

Incidentally, for example, in a mode in which the position of the center of gravity is varied by providing the grip portions at both end portions of the arm, the above-described inclined posture may not be obtained as it is, but even in such a case, the above-described inclined posture may be obtained, for example, by disposing an appropriate weight at one end portion of the arm.

(14)

Figure 22A:
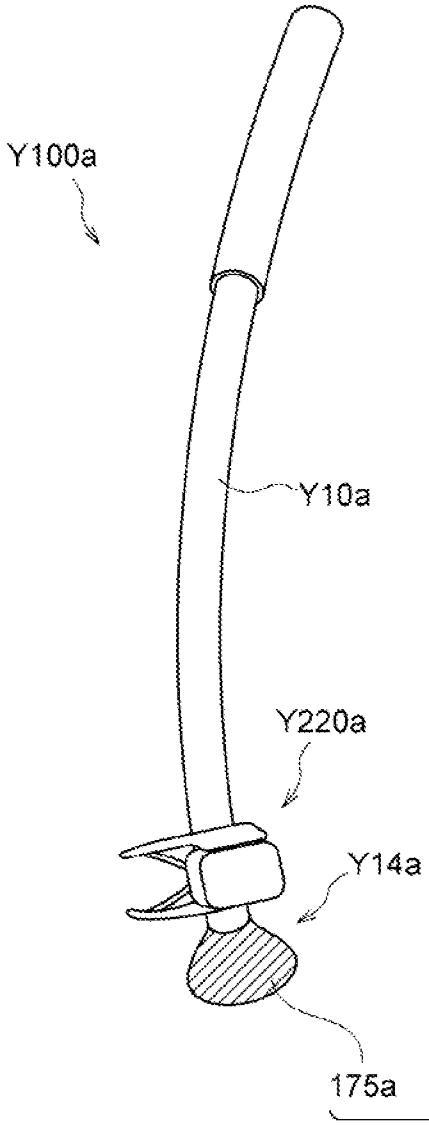
FIGS. 22(*a*) and 22(*b*) are perspective views of several further other modification examples of the medicine applicator according to the invention.
Figure 22B:
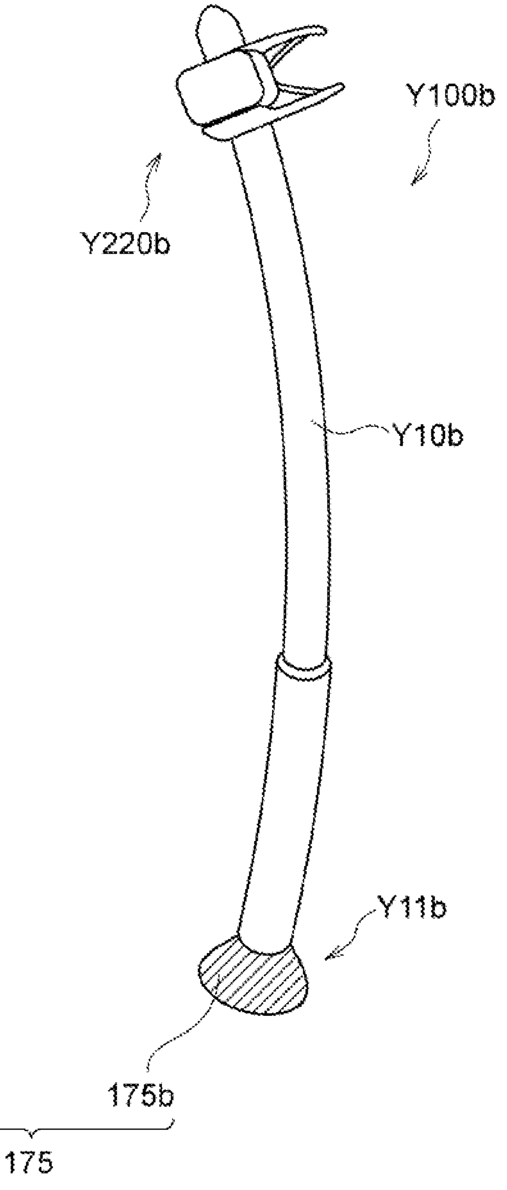

FIGS. 22(*a*) and 22(*b*) illustrate further modification examples of the medicine applicator according to the invention. Each of medicine applicators Y100*a* and Y100*b* illustrated in FIGS. 22(*a*) and 22(*b*) includes a self-standing foot 175, FIG. 22(*a*) is an example in which a self-standing foot 175*a* is provided at an extending portion Y14*a*—side end, and FIG. 22(*b*) is an example in which a self-standing foot 175*b* is provided at a grip portion Y11*b*—side end.

The self-standing foot 175*a* illustrated in FIG. 22(*a*) is formed in a substantially conical shape in which the diameter gradually increases from the extending portion Y14*a*—side end of an arm Y10*a* having a round rod shape further toward the outside. Namely, the self-standing foot 175*a* is formed in a substantially truncated cone shape in which an upper surface has a circular shape of substantially the same dimension as the lateral cross section of an extending portion Y14*a* of the arm Y10*a* and a bottom surface has a circular shape with a larger diameter (larger area) than the lateral cross section of the extending portion Y14*a*. It is desirable that a part or the entirety (at least a part) of the self-standing foot 175*a* is made of a material having a higher specific gravity than that of the material of the arm Y10*a* (for example, a combination in which the arm Y10*a* is made of ABS resin and the self-standing foot 175*a* is made of lead). The self-standing foot 175*a* may be integrally formed with the arm Y10*a*, and for example, may be configured to be attachable to and detachable from the arm Y10*a* by a magnetic body similarly to the case of the assist foot 173*a* illustrated in FIG. 21, or may be configured to be attachable and detachable by a coupling structure using a hole and a shaft. Furthermore, for example, at least outer end surface (lower end surface in FIG. 22(*a*)) of the self-standing foot 175*a* may be configured to have magnetism, so that the self-standing foot 175*a* adheres to a metal surface during its use through the magnetism, or the self-standing foot 175*a* may adhere to a surface through a suction disk.

The self-standing foot 175*b* illustrated in FIG. 22(*b*) has basically the same configuration as that of the self-standing foot 175*a* illustrated in FIG. 22(*a*), but since the self-standing foot 175*b* is provided to a grip portion Y11*b* having a slightly larger diameter than that of other portions of an arm Y10*b*, an upper surface of the self-standing foot 175*b* also has a diameter that is slightly large by the amount.

Incidentally, the self-standing foot may be provided at either end portion of the arm, or the self-standing foots may be provided at both end portions, but at least in order to improve the stability during self-standing, it is desirable that the self-standing foot is provided at an end portion of the arm on the side at which the center of gravity is located. In addition, even in this case, the position of the center of gravity may be adjusted by a weight or the like.

In the medicine applicators Y100*a* and Y100*b* according to the present modification examples, the bottom surfaces of the self-standing foots 175*a* and 175*b* are disposed to stand on a surface such as a floor surface, so that a self-standing posture (standing posture) can be held. Accordingly, for example, the work of replacing the application member such as cotton puff can be easily performed, and there is an advantage in accommodating or storing the medicine applicators Y100*a* and Y100*b*.

(15)

Figure 23A:
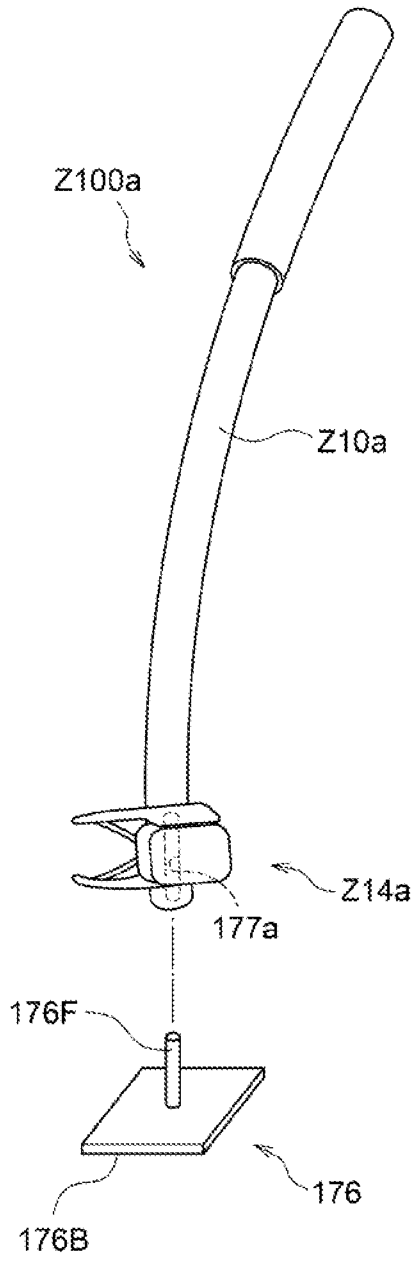
FIGS. 23(*a*) and 23(*b*) are perspective views of several further other modification examples of the medicine applicator according to the invention.
Figure 23B:
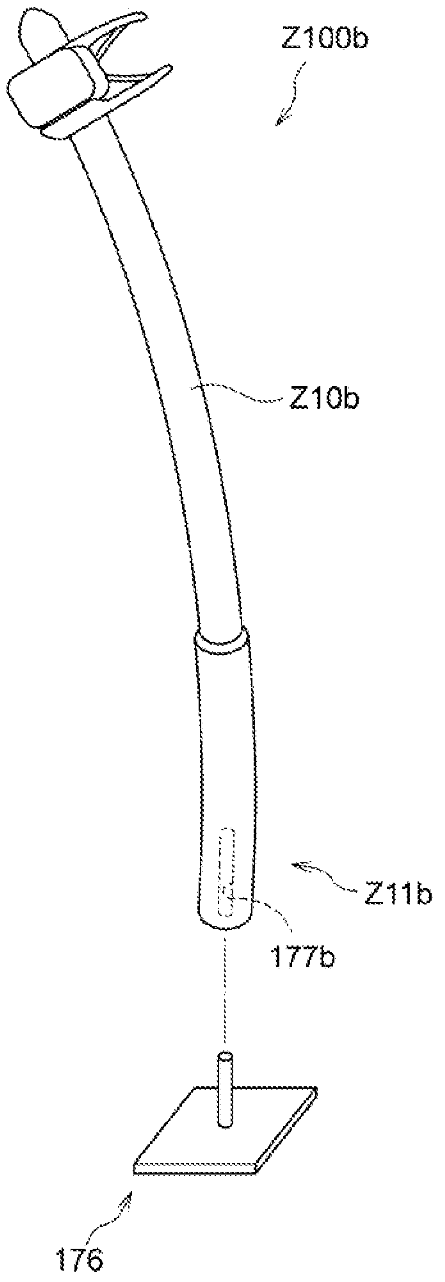

FIGS. 23(*a*) and 23(*b*) illustrate other examples of the self-standing foot, FIG. 23(*a*) is an example in which a self-standing foot 176 is provided at an extending portion Z14*a*—side end, and FIG. 23(*b*) is an example in which the self-standing foot 176 is provided at a grip portion Z11*b*—side end. The self-standing foot 176 according to the present modification example can function in substantially the same manner as the self-standing foot 175 according to Modification Example (14).

The self-standing foot 176 according to the present modification example is configured such that a support shaft 176F is provided on a base plate 176B. The base plate 176B has a rectangular plate shape and is disposed to lie flat on a surface, and the support shaft 176F having a round rod shape extends upward from a central portion of an upper surface of the base plate 176B.

In a medicine applicator Z100*a* illustrated in FIG. 23(*a*), a shaft hole 177*a* having a circular cross section is recessed to extend linearly from a center of an extending portion Z14*a*—side end surface of an arm Z10*a* along an axial direction of the arm Z10*a*. An inner diameter and a length (depth) of the shaft hole 177*a* are set such that the support shaft 176F of the base plate 176B is easily insertable into or removable from the shaft hole 177*a* and the support shaft 176F can be held in the shaft hole 177*a* without rattling.

Since a medicine applicator Z100*b* illustrated in FIG. 23(*b*) has the same configuration as that of the medicine applicator Z100*a* illustrated in FIG. 23(*a*) except that a shaft hole 177*b* is provided at a pip portion Z11*b*—side end, the medicine applicator Z100*b* is configured such that the same self-standing foot 176 can also be applied.

The medicine applicators Z100*a* and Z100*b* according to the present modification examples can easily hold a self-standing posture with a simple configuration similarly to the case of the medicine applicators Y100*a*, and Y100*b* according to Modification Example (14), but in addition thereto, the attachment and detachment of the self-standing foot 176 is facilitated.

(16)

Figure 24A:
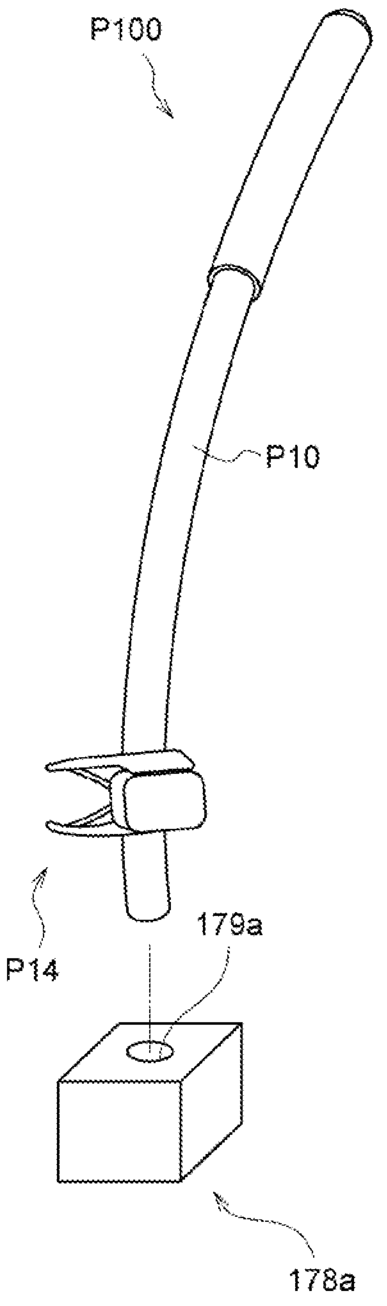
FIGS. 24(*a*) and 24(*b*) are perspective views of several further other modification examples of the medicine applicator according to the invention.
Figure 24B:
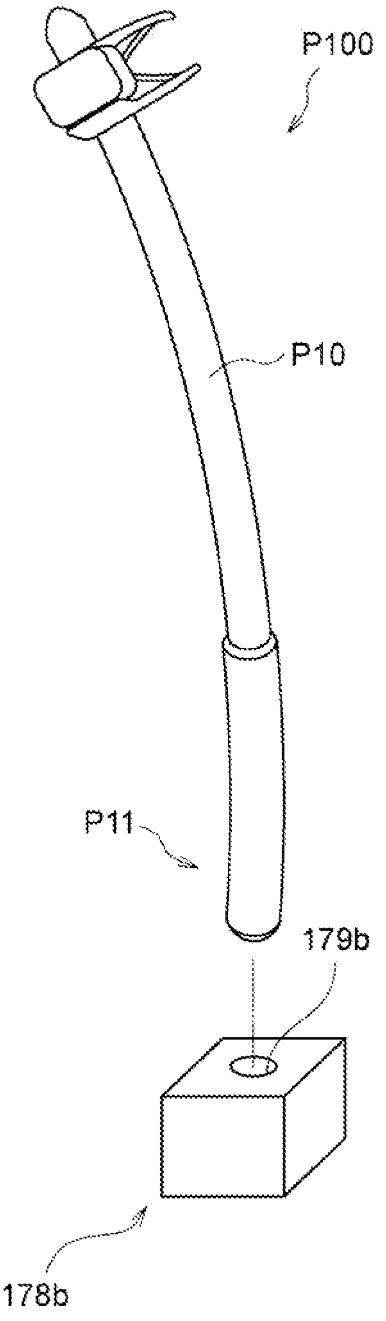
Figure 25A:
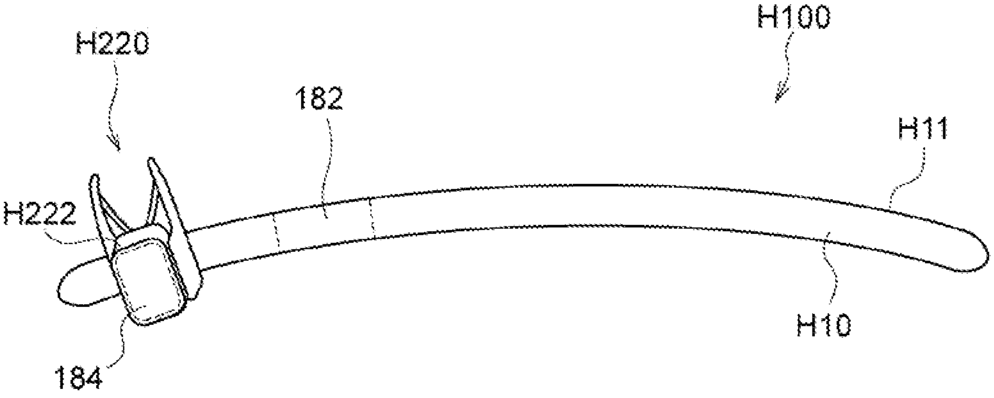
FIG. 25(*a*) is a perspective view of further another modification example of the medicine applicator according to the invention, and FIGS. 25(*b*) to 25(*e*) are side views of several modification examples of main parts of FIG. 25(*a*)
Figure 25B:
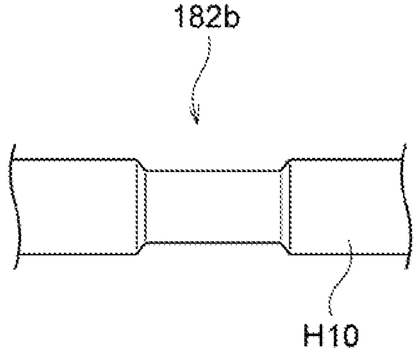
Figure 25D:
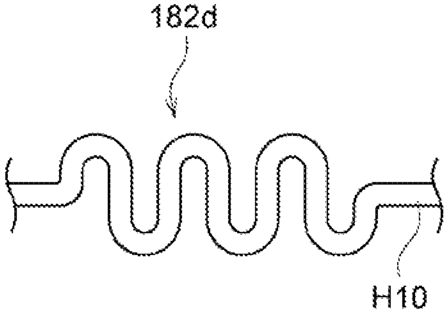
Figure 25C:
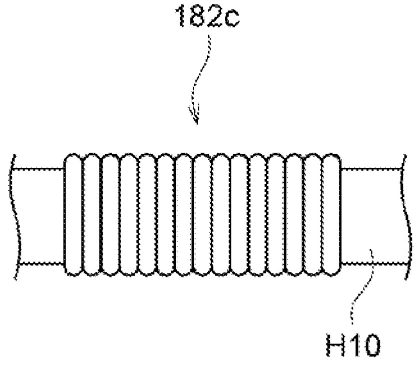
Figure 25E:
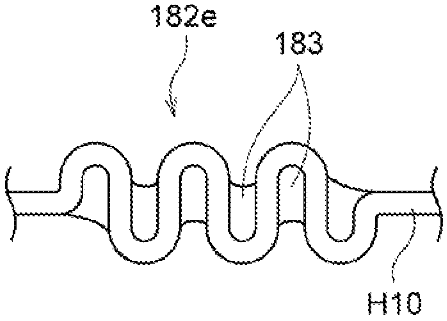

Further, for example, the self-standing foot can also be configured as illustrated in FIGS. 24(*a*) and 24(*b*). A self-standing foot 178 according to the present modification example holds an arm P10 of a medicine applicator P100 so as to be gripped from the outside, FIG. 24(*a*) is an example in which an extending portion P14—side end portion of the arm P10 is gripped, and FIG. 24(*b*) is an example in which a grip portion P11—side end portion of the arm P10 is gripped.

A self-standing foot 178*a* illustrated in FIG. 24(*a*) is formed in a rectangular parallelepiped outer shape, and a support hole 179*a* configured such that the extending portion P14—side end portion of the arm P10 is easily insertable into or removable from the support hole 179*a* and can be held therein without rattling is provided at a central portion of an upper surface of the self-standing foot 178*a*. A self-standing foot 178*b* illustrated in FIG. 24(*b*) has the same configuration as that of the self-standing foot 178*a* illustrated in FIG. 24(*a*) except that a support hole 179*b* has a slightly large diameter to correspond to the grip portion P11—side end portion.

The self-standing foot 178 (178*a* and 178*b*) according to the present modification example can function in substantially the same manner as the self-standing foot 176 according to Modification Example (15).

(17)

For example, similarly to the case of the self-standing foot 175 according to Modification Example (14), as a configuration of the self-standing foot, the self-standing foot may be configured to have magnetism, so that the self-standing foot adheres to a metal surface through the magnetism, or the self-standing foot may adhere to a surface through a suction disk.

(18)

FIGS. 25(*a*) to 25(*e*) illustrate further modification examples of the medicine applicator according to the invention. A medicine applicator H100 illustrated in FIG. 25(*a*) is an example in which an arm H10 is provided with a low-rigidity portion 182 having a relatively low rigidity, and FIGS. 25(*b*) to 25(*e*) are views specifically illustrating various configuration examples of the low-rigidity portion 182.

As illustrated in FIG. 25(*a*), the low-rigidity portion 182 is provided between a centralization portion H220 and a grip portion H11 in the arm H10 at a position that is slightly offset to the centralization portion H220. As a more specific configuration example, a low-rigidity portion 182*b* illustrated in FIG. 25(*b*) is formed by reducing the cross-sectional area of the corresponding portion of the arm H10. Further, for example, in addition to reducing the cross-sectional area in such a manner or in combination therewith, the corresponding portion of the arm H10 may be made of a material having a relatively low rigidity (for example, polyethylene or the like). A low-rigidity portion 182*c* illustrated in FIG. 25(*c*) is such that the corresponding portion of the arm H10 is formed in a bellows shape. A low-rigidity portion 182*d* illustrated in FIG. 25(*d*) is such that the corresponding portion of the arm H10 is formed in a wave shape or in a continuous S shape (meandering shape). A low-rigidity portion 182*e* illustrated in FIG. 25(*e*) is configured such that a filling material (for example, liquid silicone rubber or the like) 183 is clamped in gaps formed by the wave shape of the low-rigidity portion 182*d* illustrated in FIG. 25(*d*) and the filling material and the corresponding portion are joined to each other by bonding or the like.

In the low-rigidity portion 182 according to the present modification examples, the rigidity of the corresponding portion of the arm H10 is lowered to impart "flexibility", and accordingly, a burden on the wrist or the arm of a user can be reduced.

When the low-rigidity portion is provided, the low-rigidity portion may be provided at a part of the arm H10 as in the present modification examples, or may be provided over the entirety of the arm. In other words, the low-rigidity portion may be provided at least a part of the arm.

In addition, in the medicine applicator H100 according to the present modification example, a low-rigidity layer 184 may be provided on a use surface (surface that the body of the user contacts) of a pedestal portion H222, and the low-rigidity layer 184 is formed by applying a low-rigidity material such as liquid silicone rubber to the use surface of the pedestal portion H222. The low-rigidity layer 184 can reduce hardness, burden, or the like on the skin of the user. Even when such a low-rigidity layer is provided, the low-rigidity layer may be provided on the entirety of the pedestal portion, in other words, may be provided at least on the use surface of the pedestal portion.

(19)

Figure 26A:
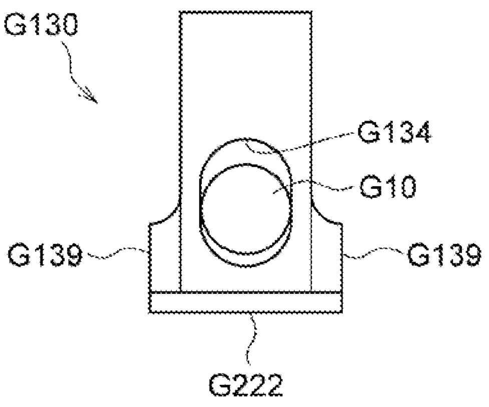
FIGS. 26(*a*) to 26(*c*) are a front view, a side view, and a bottom view of main parts of further another modification example of the medicine applicator according to the invention, respectively.
Figure 26B:
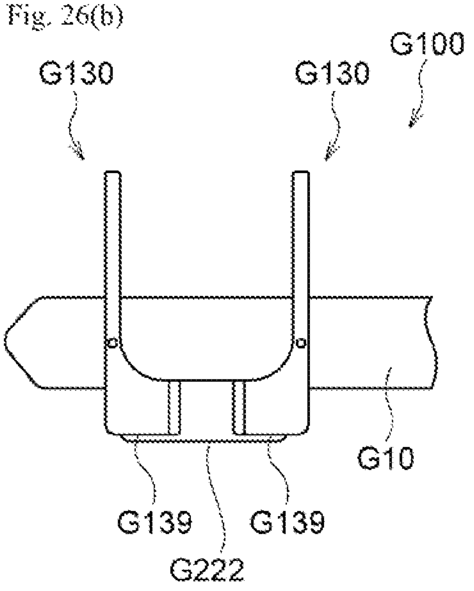
Figure 26C:
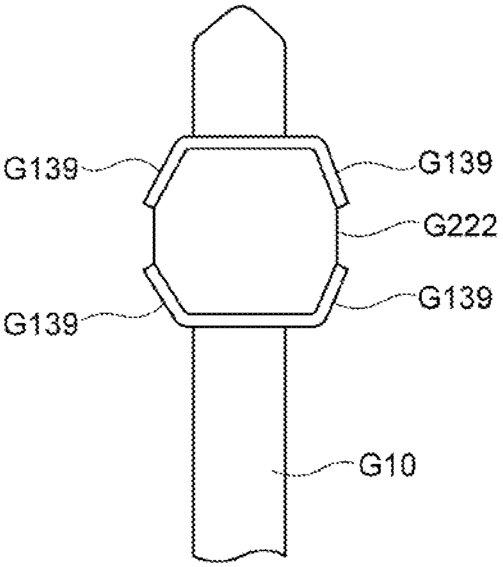

FIGS. 26(*a*) to 26(*c*) illustrate a further modification example of the medicine applicator according to the invention. In a medicine applicator G100 illustrated in the same drawing, pressing tools G130 each have configurations such as a through-hole G134 similarly to the pressing tools 130 according to the embodiment illustrated in FIGS. 1(*a*) to 1(*c*), and similarly, the pressing tools G130 are swingably attached to an arm G10, and both side portions of contact portions extend to wrap around side surface portions of a pedestal portion G222, and accordingly, extending pieces G139 are formed.

In the present modification example, as illustrated in FIG. 26(*c*), the pedestal portion G222 is formed in a substantially octagonal shape in which four corners of a square are cut off to form hypotenuses in a bottom view, namely, a three-dimensional shape including a total of ten surfaces that are eight side surfaces, an upper surface, and a lower surface. On the other hand, the extending pieces G139 of the pressing tools G130 according to the present modification example extend diagonally along side surfaces of the four corners of the pedestal portion G222 to extend outward in a bottom view, and the contact portions form a substantially angled arch shape in a bottom view as a whole.

The extending pieces G139 according to the present modification example are shaped to extend outward as described above, so that the extending pieces G139 can easily and reliably press the pedestal portion G222 without getting suck to the side surface portions of the pedestal portion G222.

As the shape of the contact portions including the extending pieces, in addition to a substantially angled arch shape in a bottom view as described above, for example, various shapes such as a substantially channel shape in a bottom view, a substantially C shape in a bottom view, and a substantially arc shape (arch shape) in a bottom view can be adopted, and the shape of the pedestal portion may be formed along substantially a shape of a pedestal portion side of the contact portions. In addition, the shape of the pedestal portion can also be a substantially circular column or elliptical column shape, and the shape can be more suitable for the skin surface of the user.

Incidentally, each embodiment is provided as an exemplary example and does not limit the invention. The scope of the invention is set forth in the appended claims.

INDUSTRIAL APPLICABILITY

The invention can be applied to the medicine applicator, the medicine application kit, and the pressing tool for a medicine applicator for applying, for example, a medicine or a cosmetic.

EXPLANATIONS OF LETTERS OR NUMERALS

10: arm, 11: grip portion, 14: extending portion, 100: medicine applicator, 102: medicine applicator, 130: pressing tool, 132: contact portion, 134: through-hole, 137: hole, 138: knob portion, 200: applicator body, 222: pedestal portion, 232: groove, 234: presser pin, 235: hole, 265: attachment hole, 268: attachment shaft, 284: holding portion, 290: shaft, 292: repulsive tool (kick spring), 292*a* to 292*c:* repulsive tool (leaf spring), 293: fastener, 294: repulsive tool (leaf spring), 296: repulsive tool (leaf spring), 300: application member 400: assist arm, 412: male screw, 414: female screw.

The invention claimed is:

1. A medicine applicator comprising:

an arm extending in a longitudinal direction, of which one end portion side is used for gripping; and a pedestal portion disposed on the arm to be substantially parallel to the longitudinal direction of the arm, wherein the medicine applicator is provided with a pair of pressing tools that attachably and detachably hold an application member on the pedestal portion, and the pair of pressing tools include a repulsive tool that generates a pressing force to bring the application member into contact with the pedestal portion, and wherein a groove is disposed in the arm, and the repulsive tool is disposed such that at least a part of the repulsive tool is fitted and held in the groove.

2. The medicine applicator according to claim 1, further comprising:

a finger contact portion for assisting an operation of the pressing tools or for operating the pressing tools.

3. The medicine applicator according to claim 2, wherein the pedestal portion is disposed at the other end portion of the arm or in the vicinity of the other end portion, a secondary arm that extends the arm is attachably and detachably attached to the other end side of the arm, and an end portion of the secondary arm is also used for gripping.

4. The medicine applicator according to claim 2, wherein the pedestal portion is disposed at a substantially central portion of the arm, and both end portions of the arm are used for gripping.

5. The medicine applicator according to claim 2, wherein the finger contact portion is slidable in a longitudinal direction of the arm.

6. The medicine applicator according to claim 1, wherein the pedestal portion is disposed at the other end portion of the arm or in the vicinity of the other end portion, a secondary arm that extends the arm is attachably and detachably attached to the other end side of the arm, and an end portion of the secondary arm is also used for gripping.

7. The medicine applicator according to claim 1, wherein the pedestal portion is disposed at a substantially central portion of the arm, and both end portions of the arm are used for gripping.

8. The medicine applicator according to claim 1, wherein one end portion sides of the pair of pressing tools are formed into respective knob portions, and the repulsive tool is a leaf spring of which both end portions are fixed to or held on back surface sides of the respective knob portions of the pressing tools.

9. The medicine applicator according to claim 1, further comprising:

a self-standing foot for holding the medicine applicator in a self-standing posture.

10. The medicine applicator according to claim 1, wherein the pressing tools each include a regulating portion that regulates an operation of the repulsive tool.

11. The medicine applicator according to claim 10, wherein the regulating portion is a protrusion and recess portion that regulates the repulsive tool so as to be slid along a predetermined trajectory.

12. The medicine applicator according to claim 10, wherein the regulating portion is a penetrated portion that regulates the repulsive tool so as to pass through the penetrated portion within a predetermined range.

13. A medicine application kit comprising:

the medicine applicator according to claim 1; and an application member disposed on the pedestal portion.

14. The medicine applicator according to claim 1, wherein the pressing tools each comprise:

a shaft support portion rotatably supported by the medicine applicator;

a contact portion extending from the shaft support portion to come into contact with the application member; and a knob portion that extends from the shaft support portion in a direction different from a direction of the contact portion, to be used for gripping.

15. The medicine applicator according to claim 14, wherein the pressing tools each further comprise:

a through-hole into which at least a part of the medicine applicator is insertable.

16. The medicine applicator according to claim 14, wherein the contact portion includes a non-slip portion comprising a protruding portion and/or a recessed portion.

17. The medicine applicator according to claim 15, wherein the contact portion includes a non-slip portion comprising a protruding portion and/or a recessed portion.

* * * * *